(12) United States Patent
Johansen et al.

(10) Patent No.: US 9,748,893 B2
(45) Date of Patent: Aug. 29, 2017

(54) PHOTOVOLTAIC ARRAY MOUNTING SYSTEM

(71) Applicant: SOLARCITY CORPORATION, San Mateo, CA (US)

(72) Inventors: Emil Johansen, San Rafael, CA (US); Martin Seery, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 23 days.

(21) Appl. No.: 14/880,085

(22) Filed: Oct. 9, 2015

(65) Prior Publication Data

US 2016/0105142 A1    Apr. 14, 2016

Related U.S. Application Data

(60) Provisional application No. 62/062,255, filed on Oct. 10, 2014.

(51) Int. Cl.
*H02S 20/23* (2014.01)
*F24J 2/52* (2006.01)

(52) U.S. Cl.
CPC ............ *H02S 20/23* (2014.12); *F24J 2/5247* (2013.01); *Y02B 10/12* (2013.01)

(58) Field of Classification Search
CPC ........ F24J 2/5256; F24J 2/5245; F24J 2/5258; H02S 40/30; H02S 20/30; H02S 20/23; H02S 20/25; H02S 20/24; H01L 31/0482
See application file for complete search history.

(56) References Cited

U.S. PATENT DOCUMENTS

| | | | | |
|---|---|---|---|---|
| 5,746,029 A * | 5/1998 | Ullman | ................... | E04D 13/12 248/237 |
| 6,046,399 A * | 4/2000 | Kapner | ................... | F24J 2/045 136/244 |
| 7,435,897 B2 * | 10/2008 | Russell | ................. | E04D 3/3608 136/244 |
| 7,797,883 B2 * | 9/2010 | Tarbell | ................... | F24J 2/5205 248/237 |
| 8,647,009 B2 * | 2/2014 | Kobayashi | ............. | F24J 2/5205 248/237 |
| 2008/0011921 A1 * | 1/2008 | Aramaki | ................ | F24J 2/5205 248/237 |
| 2009/0007901 A1 * | 1/2009 | Luconi | ................... | F24J 2/5239 126/627 |
| 2014/0175244 A1 * | 6/2014 | West | ...................... | F24J 2/5205 248/316.7 |

* cited by examiner

*Primary Examiner* — Paola Agudelo
(74) *Attorney, Agent, or Firm* — Kilpatrick Townsend & Stockton LLP

(57) ABSTRACT

A system for mounting a photovoltaic array onto short sections of mounting rails such that a section of mounting rail is only installed fewer than all the photovoltaic modules in the array. A single section of mounting rail may support one, two or three photovoltaic modules depending on it's length and position respect to the edge of each module frame.

19 Claims, 14 Drawing Sheets

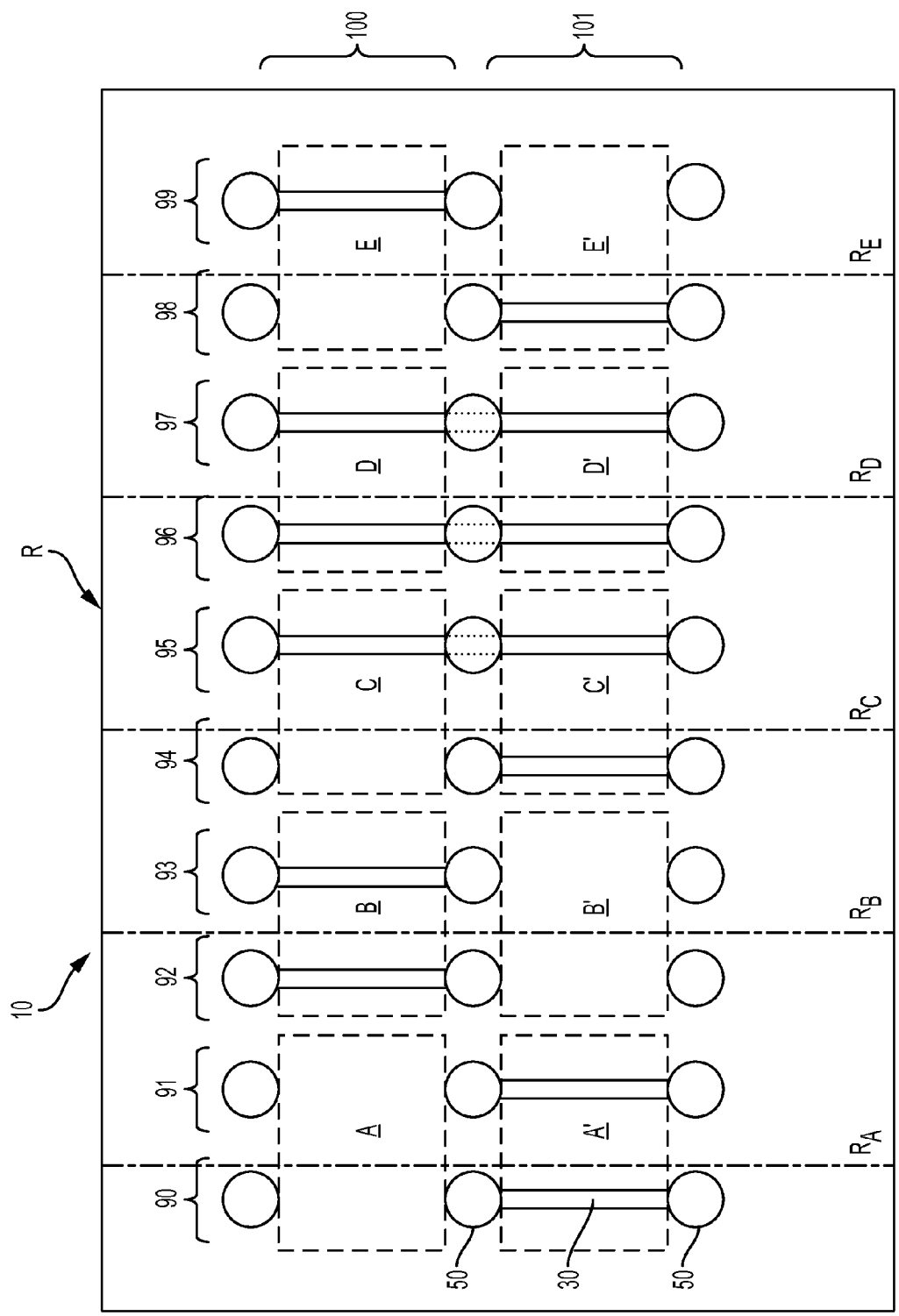

PHOTOVOLTAIC ARRAY MOUNTING SYSTEM

CROSS-REFERENCE TO RELATED APPLICATION

The present disclosure claims the benefit of U.S. Provisional Patent Application No. 62/062,255, entitled "PHOTOVOLTAIC ARRAY MOUNTING SYSTEM WITH SPANNER BARS OMITTED EVERY SECOND PHOTOVOLTAIC MODULE," filed on Oct. 10, 2014.

TECHNICAL FIELD

The present invention relates to mounting systems for photovoltaic modules.

BACKGROUND OF THE INVENTION

There are many systems available for mounting photovoltaic (PV) modules to building structures, such as a roof. These systems serve as a rigid interconnection element between a roof and a PV module to hold the modules in place and resist the forces of gravity and wind. PV module frames themselves are sufficiently rigid to function in part as the rails of a PV mounting system. By utilizing the inherent rigidity of modules frames as part of the PV mounting system, system part counts and costs of PV mounting systems were significantly reduced while installation time and overall aesthetics were improved.

Many existing photovoltaic arrays are secured to mounting rails. These mounting rails typically run under the full width or length of the array, and form the backbone onto which the array is built. In the case of composition shingle roofs, the rails may be mounted directly to the roof or indirectly via an elevated mounting bracket, flashing or other structure. For tile roofs, rails are typically attached to a tile hook or other structure that passes through the opening between two adjacent rows of tiles and elevates the PV array above the tile roof. The degree of elevation will vary depending on the nature of the tile roof (e.g., curved, wave, flat, etc.).

Although effective at supporting a PV array, these traditional rail configurations require complex and time-consuming installations and utilize relatively large amount of materials. Also, the use of mounting rails can still result in physical or mechanical conflicts with other components of the mounting systems or PV modules. Further, securing long mounting rails to the roof can still be time consuming and requires a substantial amount of relatively expensive extruded aluminum, stainless steel or other corrosion resistant metal. Moreover, since mounting rails ideally are to be secured at a uniform height across the roof, any irregularities such as dips and bends in the roof can make it difficult to secure the rails such that they remain at the desired height because the rails are rigid.

Accordingly, there is a need for a PV mounting system that enjoys the benefits of existing mounting rail system solutions, while reducing costs, improving installation alignment, and increasing installation times relative to such systems.

BRIEF SUMMARY OF THE INVENTION

The present invention provides a system for mounting a photovoltaic array onto short sections of mounting rails such that a mounting rail is only installed under some of the photovoltaic modules in the array.

An advantage of this system is that it reduces the number of rail sections used by only installing smaller discrete sections of rails under photovoltaic modules of an array.

Another advantage is that the ends of the rail sections do not have to be joined together, thereby eliminating rail-to-rail end connectors.

Another advantage of the present system is that the rails do not have to be finely aligned (in the end-to-end direction) to one another across the array. As will be shown, this is due to the fact that moveable leveling feet are provided at both ends of the rails, and the position of these leveling feet can be adjusted in both the X- and Y-directions (in addition to the Z-direction). Having these adjustably positionable leveling feet allows module-to-module connectors (which are mounted onto the leveling feet) to be positioned at the side edges of the individual modules in the array.

Another advantage is that the rail sections can be configured to distribute the weight load of the photovoltaic array across different areas of a roof, or across different load bearing structural elements (e.g. rafters, battens) of a roof.

Various embodiments of the invention may utilize module-to-module connectors such as in "rock-it" connectors such as those described in commonly assigned Published Patent Application 2014/0175244 (Ser. No. 14/106,153) entitled "Connecting Components For Photovoltaic Arrays", which is herein incorporated by reference. By using such "rock-it" connectors, the individual modules can be pivot dropped into their installed positions. This makes array assembly fast and easy relative to other PV module connectors. However, it should be appreciated that other types of module connectors may be used with the invention including clamping or wrap-around module connectors. Since the positions of the leveling feet can be adjusted, the positions of the module-to-module connectors can be adjusted as well.

Some embodiments disclosed herein are ideal for use with tile roof mounting systems. However, it is to be understood that it may be used with other roof types and mounting sections as well. Moreover, the present system can be used with different rail and spanner bar designs.

Many embodiments are related to a photovoltaic array mounting system having a plurality of spaced-apart roof attachment mounts, a plurality of spanner bars mounted onto the roof attachment mounts, such that the spanner bars do not extend under all of the dead spaces under each photovoltaic module in the array so that every module is connected to a section of spanner bar every time the spanner bar passes under or reaches the frame of the module without continuous sections of spanner bar running underneath every photovoltaic module.

In many embodiments, the mounting system can further include a plurality of PV modules, where the side edges of adjacent photovoltaic modules are mounted onto the module-to-module connectors, such that a spanner bar is only installed under at or under the edge of every second photovoltaic module but does not necessarily span the entire width or length of each photovoltaic module in the array.

Many embodiments are also related to a photovoltaic array mounting system having a first set of spanner bars configured to mount a structure along a first axis, a first set of leveling feet, where each spanner bar of the first set of spanner bars have ends configured to support at least one of the first set of leveling feet, and a first set of module-to-module connectors, where each leveling foot of the first set of leveling feet is configured to support at least one of the first set of module-to-module connectors, and where each module-to-module connector of the first set of module-to-module connectors is also configured to support at least two photovoltaic modules along the first axis, such that at least one photovoltaic module can span a gap along the first axis within the first set of spanner bars and be supported only by module-to-module connectors along the first axis.

In many embodiments photovoltaic array mounting system can also have a second set of spanner bars configured to mount a structure along a second axis, a second set of leveling feet, where each spanner bar of the second set of spanner bars have ends configured to support at least one of the second set of leveling feet, and a second set of module-to-module connectors, where each leveling foot of the second set of leveling feet is configured to support at least one of the second set of module-to-module connectors, and where each module-to-module connector of the second set of module-to-module connectors is configured to support at least two photovoltaic modules along the second axis, such that at least one photovoltaic module can span a gap along the second axis within the second set of spanner bars and be supported only by module-to-module connectors of the second set of module-to-module connectors along the second axis.

In many embodiments the position of the first set of leveling feet are adjustable for alignment of the photovoltaic modules along the first axis. Similarly, in many embodiments, the position of the second set of leveling feet are adjustable for alignment of the photovoltaic modules along the second axis.

In many embodiments, one or more gaps along the first axis within the first set of spanner bars are paired relative to one or more gaps along the second axis within the second set of spanner bars. Also in many embodiments, one or more gaps along the first axis within the first set of spanner bars are staggered relative to one or more gaps along the second axis within the second set of spanner bars.

Many embodiments of a mounting system for a photovoltaic array are also related to a first set of spanner bars configured to mount a structure along a first axis, a second set of spanner bars configured to mount a structure along a second axis, a set of leveling feet, wherein each spanner bar of the first set of spanner bars and the second set of spanner bars have ends configured to support at least one of the set of leveling feet, and a set of module-to-module connectors, where each leveling foot of the set of leveling feet is configured to support at least one of the set of module-to-module connectors, and where each module-to-module connector of the set of module-to-module connectors is configured to support at least two photovoltaic modules along the first axis and the second axis, such that at least one photovoltaic module can span one or more gaps along either or both of the first axis or the second axis and be supported by module-to-module connectors along the first axis and second axis.

In many embodiments, a position of the set of leveling feet are adjustable for alignment of the photovoltaic modules along an axis defined by a set of spanner bars. In some embodiments, one or more of the gaps along a first axis within a first set of spanner bars are paired relative to one or more of the gaps along a second axis within the second set of spanner bars. In some embodiments, one or more of the gaps along a first axis within the first set of spanner bars is staggered relative to one or more of the gaps along a second axis within the second set of spanner bars.

In many embodiments, a mounting system can further include a third set of spanner bars configured to mount a structure along a third axis and a fourth set of spanner bars configured to mount a structure along a fourth axis, where each spanner bar of the third set of spanner bars and the fourth set of spanner bars have ends configured to support at least one of the set of leveling feet, and where each module-to-module connector of the set of module-to-module connectors are further configured to support at least two photovoltaic modules along the third axis and the fourth axis, such that at least one photovoltaic module can span one or more gaps along either or both of the third axis or the fourth axis and be supported by module-to-module connectors along the third axis and fourth axis. In some embodiments, the arrangement of the first plurality of spanner bars and the second plurality of spanner bars are staggered relative to the arrangement of the third plurality of spanner bars and the fourth plurality of spanner bars. In some embodiments, the arrangement of the first plurality of spanner bars and the second plurality of spanner bars are mirrored relative to the arrangement of the third plurality of spanner bars and the fourth plurality of spanner bars.

In many embodiments, the roof attachment mounts of the mounting system can have a tile hook and a flashing.

In many embodiments, the ends of the spanner bars can be connected to the roof attachment mounts.

In many embodiments, the leveling feet can be connected into an upper channel in the spanner bars.

In many embodiments, the leveling feet of the mounting system can each rotate around a base portion mounted onto the spanner bar.

In many embodiments, the module-to-module connectors of the mounting system can be rock-it connectors.

In many embodiments, the mounting system can have one or more of the spanner bars mounted onto the roof attachment mounts in cantilever.

In many embodiments, each leveling foot mounted at each end of each spanner bar is configured to adjust in position and orientation such that the plurality of photovoltaic modules have an alignment to form a generally planar surface In addition to the exemplary aspects and embodiments described above, further aspects and embodiments will become apparent by reference to the figures and by study of the following detailed descriptions.

BRIEF DESCRIPTION OF THE DRAWINGS

Illustrative aspects of the present disclosure are described in detail below with reference to the following drawing figures.

FIG. 9B is an alternative schematic layout of the present system on an exemplary roof, according to aspects of the disclosure.

DETAILED DESCRIPTION OF THE INVENTION

Figure 1:
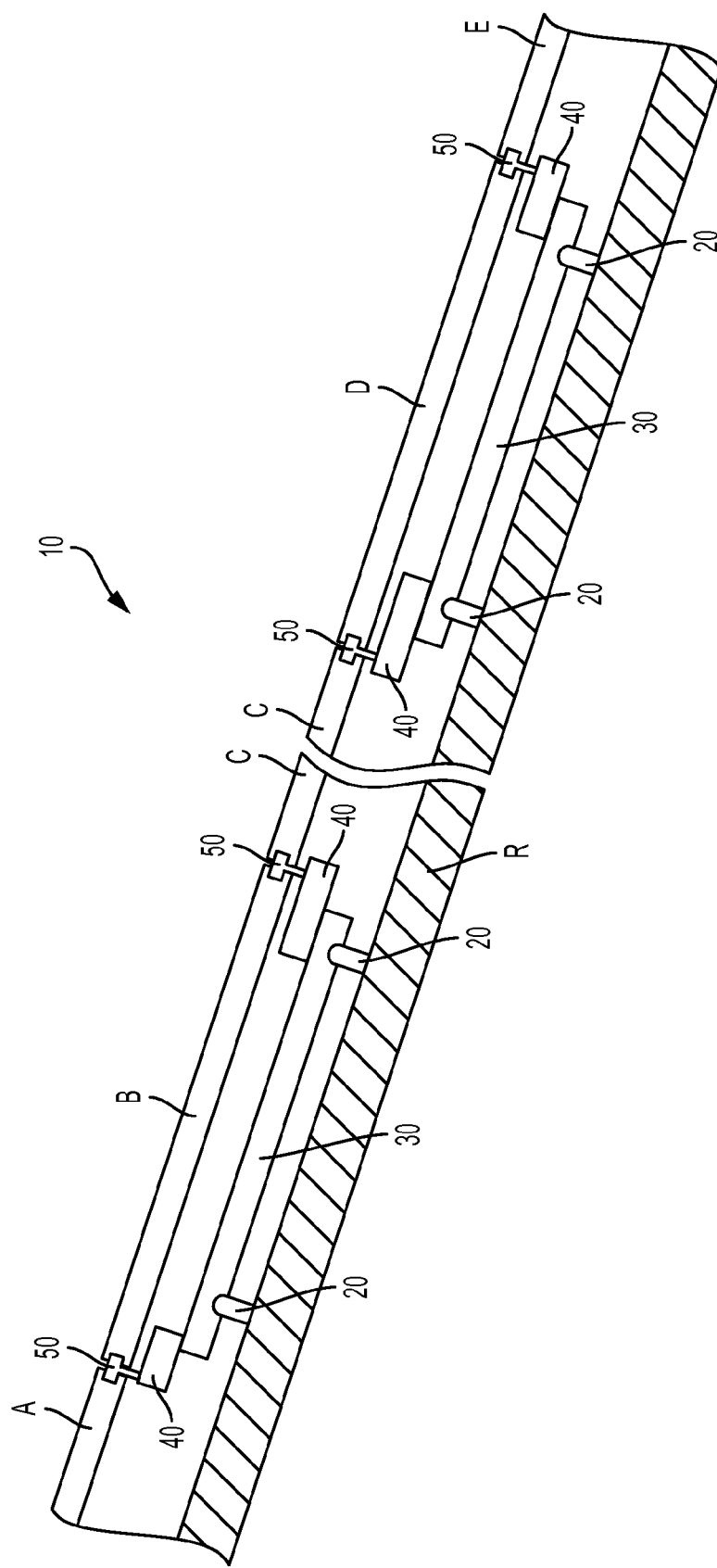
FIG. 1 is a side elevation view schematic of the present system, according to aspects of the disclosure.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Embodiments of the invention are generally directed towards a system for mounting a PV module to a support structure such as a roof surface. The system can include one or more spanner bars positioned and configured to support one or more PV modules, where each spanner bar provides two points of contact for support of a PV module. Advantageously, such a system distributes the load of the overall photovoltaic array across areas of the roof, generally reduces material needs, generally avoids physical conflicts with other components of the system, and is adaptable to uneven or irregular roof surfaces such that the surface of the photovoltaic array is aligned in a desired and designed configuration. The following description details some examples of such a system.

In particular, the present system provides a photovoltaic array mounting system having spanner bars which are omitted under at least some of the photovoltaic modules along the array, such as, for example, every other module or every N modules where N is a positive integer. The present system further provides a photovoltaic array mounting system having spanner bars provided in an alternating, staggered, intermittent, or patterned configuration supporting PV modules of the array, such that a subset of the total number of PV modules have a spanner bar underneath and connected to attachment mounts of the mounting system. In other words, a converse subset of the total number of PV modules are supported as part of the present system, even though a spanner bar is omitted from being directly underneath the converse subset of PV modules. The photovoltaic array mounting system of the present disclosure, through use of mounting structures that do not include single, continuous rail sections running along an entire length of a roof, along a majority of a length of a roof, or underneath each PV module of a given photovoltaic array, allow for greater flexibility in design, customization, configuration, and alignment of the mounting system and the photovoltaic array.

The disclosed system allows for the number of rail sections used for mounting to be minimized, or significantly reduced relative to mounting systems known in the industry. In some embodiments, the number of spanner bars used, relative to traditional rail configurations or other rail-based mounting systems, can be reduced and/or cut in half, where a supporting rail element is installed under some but not all PV modules in an array. In other embodiments, the amount of material used for rail sections can be about three-quarters, about two-thirds, or the like, relative to the amount of material used for traditional rail configurations or other mounting rail systems, where a supporting rail element is installed underneath more than half, but less than all of the PV modules in an array. The minimization/reduction in the amount of material used to mount the PV modules and overall array provides for a corresponding minimization/reduction in weight, material cost, and installation complexity.

The disclosed system further allows for the use of rail sections where the ends of the rail sections do not have to be directly joined or coupled together, thereby eliminating the need for rail-to-rail end connectors. Mounting structures that include a single rail structure running along an entire length of a roof, or along a majority of a length of a roof, is often constructed from two or more rail sections. The two or more rail sections thus need to be coupled and aligned with each other, in order to provide a stable and uniform mounting structure for supporting PV modules. Bypassing the need for a single rail structure that extends along an entire length of a roof, or along a majority of a length of a roof, eliminates the need to connect and align two or more component rail sections to form a single rail structure, which further removes the need for connecting hardware (e.g. splices, bolts, etc.) at the ends of rail sections.

The disclosed system also allows for the use of rail sections where the rails sections do not have to be finely aligned (in the end-to-end direction) to one another across the array. Where the disclosed rail sections are spanner bars, the spanner bars are configured to support moveable leveling feet which are provided at one or both ends of a spanner bar. The position of each of these leveling feet can be adjusted in the X-, Y-, and Z-directions, which in turn allows for module-to-module connectors mounted onto the leveling feet to adjust in position along the side edges of individual modules in the array. Adjustment of the module-to-module connectors allows for alignment of PV modules of a photovoltaic array, such that the photovoltaic array is generally planar and in a configuration to optimize the orientation of the photovoltaic array on a given roof. Indeed, an uneven, irregular, or discontinuous roof surface can cause roof attachment mounts to be placed in positions that lead the rail sections or spanner bars of the mounting system to have an undesired alignment, relative to each other. Because the leveling feet are adjustable, capable of translating in any or all of the X-, Y-, and Z-directions, the leveling feet can account for the uneven, irregular, or discontinuous roof surface such that the PV modules are in a desired functional alignment to form a generally planar surface for the photovoltaic array.

The disclosed system further allows for the rail sections to be installed in a configuration where the weight load of the photovoltaic array is distributed across different areas of a roof. In some aspects, the weight load of the photovoltaic array can be particularly distributed across different load bearing structural elements of a roof, such that individual rafters or battens of a roof are not supporting the complete load of a photovoltaic array. Further, the disclosed system allows for discontinuous rail sections which can be customized or adapted for installation on a given roof to avoid physical or mechanical conflicts with other structures of the roof or the mounting system.

The installation of a PV module to a mounting system can be a time and labor intensive process. When a PV module is being installed and placed on mounting structure elements of the mounting system, if the installation point has a single point of contact, the moment of inertia of the PV module around an axis at the single point of contact can make installation of the PV module challenging. In contrast, installing a PV module onto a mounting structure having two points of contact, such as a spanner bar as in the present disclosure, allows for a more controlled and secure installation process. Where the mounting structure has two points of contact, rotation of the PV module as it is being installed is more easily controlled or minimized, and the weight of the PV module can be supported on one side of the PV module while the opposing side of the PV module is being handled or undergoing fine adjustments.

FIG. 1 is a side elevation view schematic of the present system. As seen in FIG. 1, system 10 is mounted onto roof R. System 10 comprises plurality of spaced-apart roof attachment mounts 20 with plurality of spanner bars 30 mounted onto roof attachment mounts 20. Leveling foot 40 is mounted at each end of each spanner bar 30, and module-to-module connector 50 is mounted onto each leveling foot 40.

As can be seen, spanner bars 30 are only positioned between every second pair of roof attachment mounts 20 and are omitted between every second pair of roof attachment mounts 20. Specifically, five photovoltaic modules, A, B, C, D, and E have spanner bars 30 running thereunder such that one spanner bar 30 runs underneath modules B and D, but does not run underneath modules A, C and E.

Module-to-module connectors 50 may be "rock-it" connectors as are fully described in Published Patent Application 2014/0175244 (Ser. No. 14/106,153) entitled "Connecting Components For Photovoltaic Arrays". Alternatively, module-to-module connectors may be wrap-around or clamping connectors as is known in the art. As such, the side edges of adjacent photovoltaic modules A and B are supported by a first connector; the side edges of adjacent photovoltaic modules B and C are supported by a second connector; the side edges of adjacent photovoltaic modules C and D are supported by a third connector, etc. As can be appreciated, the modules A, B, C, D and E are held together with spanner bars 30 only being installed under photovoltaic modules B and D. The position of module connectors 50 and spanner bars 30 allows two spanner bars to support modules A, B, C, D, and E. Although not shown, there would also be a small section of spanner bar supporting the other sides of modules A and E (not shown in FIG. 1). Also, it should be appreciated that module C is the same dimension as modules B and D but has been shown as reduced in size for ease of illustration.

In other words, FIG. 1 shows an exemplary configuration of a photovoltaic array mounting system 10, formed from PV modules A, B, C, D, and E arranged in-line with each other, where pairs of roof attachment mounts 20 and corresponding spanner bars 30 are positioned alternatingly beneath the PV modules on a roof R. The arrangement of this exemplary embodiment results in spanner bar 30 being located underneath each of PV module B and PV module D. Each of spanner bars 30 have a leveling foot 40 on each end of the spanner bar, and each leveling foot 40 supports module-to-module connector 50, such that module-to-module connector 50 is located on opposing sides of PV module B and PV module D, where the opposing sides of those PV modules are perpendicular to the length of the photovoltaic array. Module-to-module connectors 50 on either side of PV module B secure PV module B to PV module A and PV module C. Similarly, module-to-module connectors 50 on either side of PV module D secure PV module D to PV module C and PV module E. In this arrangement, each of PV module A, PV module C, and PV module E are supported without spanner bar 30 located directly underneath those PV modules.

In various embodiments, the individual PV modules of system 10 can have equal widths, lengths, or areas, or can have different widths, lengths, or areas. In further embodiments, from one row of a photovoltaic array to the next on a given roof R, the PV modules of each photovoltaic array row can have equal widths, lengths, or areas, or can have different widths, lengths, or areas. PV module C is shown in FIG. 1 with broken lines in part to reflect the variable length of width the PV modules can have in system 10. Indeed, the capability to support PV modules with spanner bars 30 omitted underneath some subset of PV modules in a photovoltaic array allows for system 10 to save a significant amount of spanner bar 30 material, as well as other structural materials for mounting the photovoltaic array.

Roof attachment mounts 20 can be made of structural materials known in the industry. For example, roof attachment mounts 20 can be constructed from aluminum, rolled steel, or alloys or combinations thereof, and can be manufactured by press or extrusion processes, or the like. Roof attachment mounts 20 can connect to the roof R, where the base of roof attachment mounts 20 can be conical, substantially conical, rectangular, substantially rectangular, square, or the like. Roof attachment mounts 20 can be spaced-apart in pairs, and arranged on the roof R to provide for anchor points to structurally strong areas (e.g. framing elements) of the roof R. Roof attachment mounts 20 of a given pair can have a regular or variable spaced-apart distance within (or between) each other. Similarly, a plurality of pairs of roof attachment mounts 20 can have a regular or variable spaced-apart distance within each paring. Roof attachment mounts 20 can further have two sections, such as a base and a riser section, where the riser section extends upward to connect with a section of spanner bar 30, and where the base is configured to attach to the roof R. In some aspects, bases of roof attachment mounts 20 can have flanges, configured in part to distribute weight on the roof R. Roof attachment mounts 20 can be connected to the roof R via connectors such as bolts, lag screws, or the like, connecting to structural elements of the roof R such as rafters, battens, purlins, ridges, studs, or the like.

Spanner bars 30 can be made of structural materials known in the industry. For example, spanner bars 30 can be constructed from aluminum, rolled steel, or alloys or combinations thereof, and can be manufactured by press or extrusion processes, or the like. In various embodiments, spanner bars 30 can have a length approximately equal to: a width of one PV module, a length of one PV module, a width of two or more PV modules, or a length of two or more PV modules. In various embodiments, for any given system 10 on roof R, spanner bars 30 can each have the same length or can have different lengths.

In some aspects, where system 10 includes spanner bars 30 having different lengths, some spanner bars 30 can extend underneath one PV module, while other spanner bars 30 can extend underneath two or more PV modules. In some embodiments, spanner bars 30 that extend underneath two PV modules can be connected to a pair of roof attachment mounts 20, where the pair of roof attachment mounts 20 are positioned directly underneath a first of the two PV modules. Accordingly in such embodiments, spanner bar 30 extends underneath and supports the second of the two PV modules in cantilever. Such a configuration can be of use for support of photovoltaic array rows where roof attachment mounts 20 may not be available, for example, at the north end or crest of a roof R. In further embodiments, spanner bars 30 that extend underneath two PV modules can be connected to a number of roof attachment mounts 20 positioned under both of the PV modules.

In some embodiments, a photovoltaic array can have a skirt assembly adjacent to one side of the photovoltaic array, for example at the south end or edge of a roof R. In such cases, edges of PV modules for that row of the photovoltaic array can be mounted and supported by module-to-module connectors 50 that couple with both one side of the PV module and with the skirt assembly.

Figure 2:
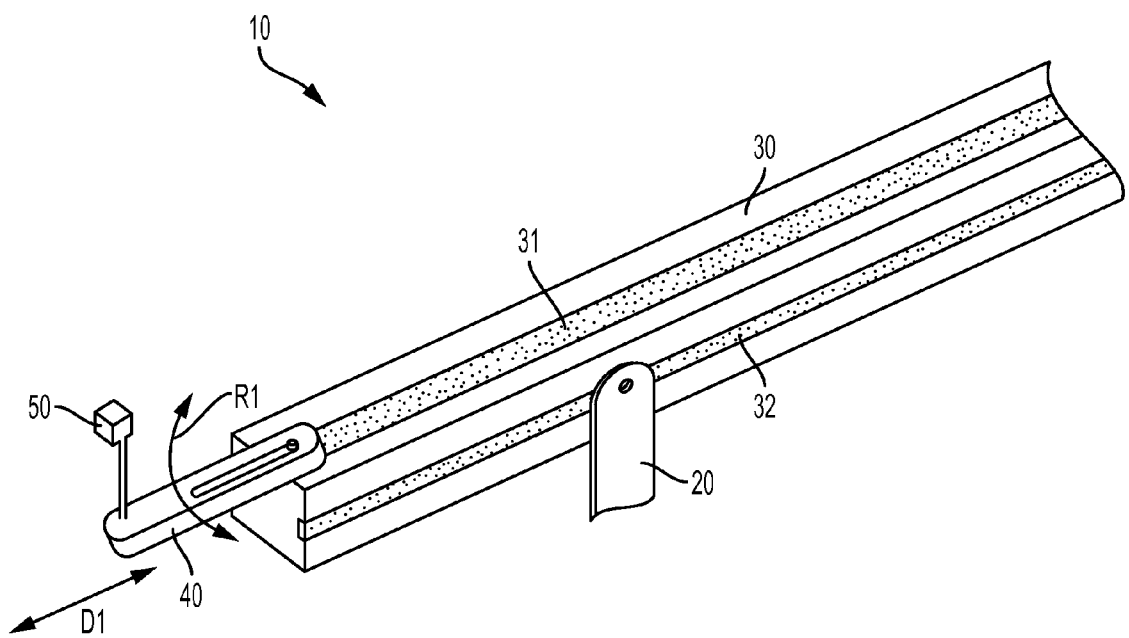
FIG. 2 is an end perspective view schematic of one of the spanner bars showing placement and movement of the leveling foot, according to aspects of the disclosure.

FIG. 2 is an end perspective view schematic of one of spanner bars 30 showing placement and movement of leveling foot 40. As can be seen, leveling foot 40 can optionally be connected into upper channel 31 extending along the length of the spanner bar. Roof attachment mounts 20 may optionally comprise a tile hook and a flashing, but other mounts are also contemplated within the scope of the present invention. Roof attachment mount 20 may optionally be connected into side channel 32 extending along the length of the spanner bar.

As seen in FIG. 2, leveling foot 40 may be moved back and forth in direction D1 as well as rotated in direction R1 prior to its final attachment to spanner bar 30. As such, by adjusting the position of leveling foot 40, the position of module-to-module connector 50 may also be adjusted. This makes the positioning of the modules fast and easy. Moreover, successive spanner bars 30 need not be perfectly aligned end to end. Rather, spanner bars 30 can be slightly misaligned and the position of leveling feet 40 can be adjusted such that the photovoltaic modules can still easily be positioned at their desired locations. Preferably, each leveling foot 40 can be rotated around a base portion that is mounted onto spanner bar 30. In other words, any given leveling foot 40 mounted on spanner bar 30 adjustable in both position and orientation along spanner bar 30 such PV modules mounted as part of system 10 can be aligned to form a generally planar surface, or other functional surface as appropriate for a photovoltaic array installation.

In some embodiments, upper channel 31 and side channel 32 can be shaped as grooves as fully described in commonly assigned Published Patent Application 2012/0298817 (Ser. No. 13/402,846) entitled "Pivot-Fit Frame, System and Method for Photovoltaic Arrays", which is herein incorporated by reference. In other embodiments, upper channel 31 and side channel 32 can be shaped as grooves having configurations known in the industry. Both of upper channel 31 and side channel 32 can be shaped to allow for movement and adjustment of coupling structures, such as roof attachment mounts 20 or leveling feet 40, and for securing and locking-in the location of roof attachment mounts 20 or leveling feet 40 once a desired position along spanner bar 30 is reached or set.

Leveling foot 40 as shown in FIG. 2 is adjustable to translate in at least the X- and Y-directions, relative to the upper surface of spanner bar 30. Specifically, leveling foot 40 is capable of rotating 360° in direction R1 around an axis of rotation, where that axis of rotation is based upon where leveling foot 40 is secured into upper channel 31. In many aspects, considered along a longitudinal axis of leveling foot 40, leveling foot 40 does not have a functional degree of roll rotation. Similarly, in many aspects, considered along a lateral axis of leveling foot 40, leveling foot 40 does not have a functional degree of tilt or pitch rotation. Further, leveling foot 40 is adjustable to move along the length of spanner bar 30 in direction D1, where a connection element between leveling foot 40 and upper channel 31 allows for movement of leveling foot 40 when the connection element is loosened. When the connection element between leveling foot 40 and upper channel 31 is tightened, leveling foot 40 is secured at a position along the length of spanner bar 30. In some aspects, the connection element between leveling foot 40 and upper channel 31 can be adjusted to allow for adjustment of the location of leveling foot 40 in the Z-direction, relative to the upper surface of spanner bar 30. In alternative embodiments, spanner bar 30 can have a channel in a lower surface (i.e. opposite the upper channel 31) of spanner bar 30. In further embodiments, spanner bar 30 can have a channel in a side of spanner bar 30 opposite of side channel 32.

Roof attachment mounts 20 can have connection elements that couple with side channel 32, where roof attachment mounts 20 can be secured at any location within side channel 32 along the length of spanner bar 30. Accordingly, spanner bar 30 can be positioned or anchored relative to a pair of roof attachment mounts 20 in configurations where the pair of roof attachment mounts 20 are biased to one side of spanner bar 30, at a set distance from each other along the length of spanner bar 30, equidistant from the ends of spanner bar 30, at unequal distances from the ends of spanner bar 30, set along the length of spanner bar 30 such that spanner bar 30 is mounted in cantilever, or the like.

Module-to-module connector 50 as shown in FIG. 2 is an abstracted representation of a connector capable of coupling a variety of modules and structures known in the field. Module-to-module connector 50 is mounted to leveling foot 40, and can be adjusted in the Z-direction relative to leveling foot 40, and by extension relative to the upper surface of spanner bar 30. In some aspects, module-to-module connector 50 is configured to concurrently couple two structural elements on either side of module-to-module connector 50, such as two PV modules (as seen in FIG. 1) or a PV module and a skirt assembly. In further aspects, module-to-module connector 50 is configured to secure and support a structural element on one side of that structure, without a second structural element on the opposite side off module-to-module connector 50. In other words, module-to-module connector 50 can operate as a coupling connector between two structures, and module-to-module connector 50 can also operate as supporting a structure on the end of a photovoltaic array row or system. In some aspects, module-to-module connector 50 can also directly couple to spanner bar 30, anchored, for example, in upper channel 31. In such aspects, module-to-module connector 50 is not necessarily coupled via leveling foot 40 to spanner bar 30. In installations where module-to-module connector 50 is located along the length of spanner bar 30, where spanner bar 30 extends underneath two or more PV modules, module-to-module connector 50 can support adjacent PV modules suspended above spanner bar 30.

FIGS. 3-8 are additional views of the present system numbered with the element numbers described above.

Figure 3:
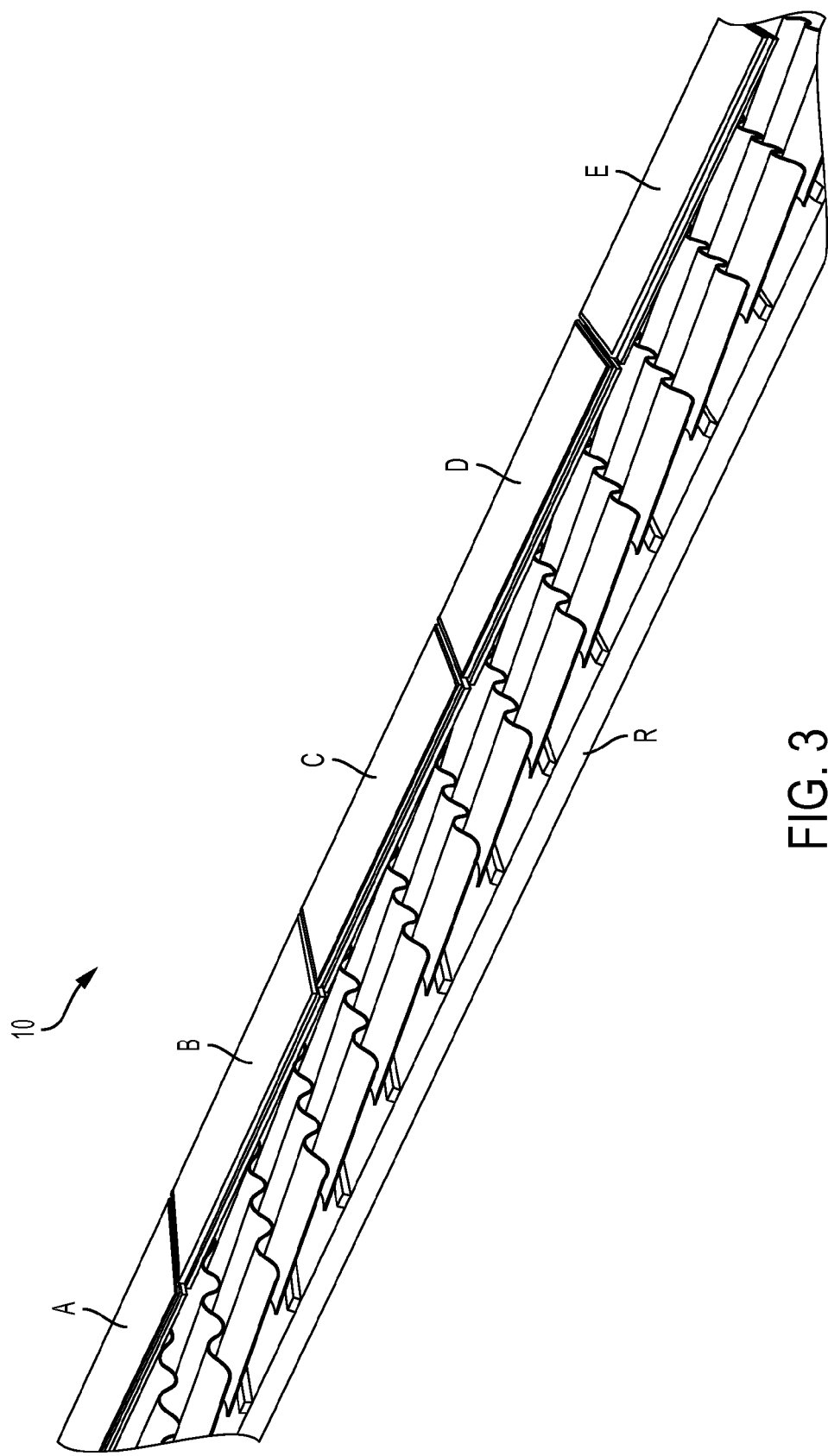
FIG. 3 is a first perspective view of a tile roof with the present system mounted thereon, according to aspects of the disclosure.

FIG. 3 is a first perspective view of an exemplary tile roof R with system 10 mounted thereon. As shown, PV modules A, B, C, D, and E are arranged in a row along the slope of a roof R. The size of the PV modules, and spacing in between the PV modules, forms a photovoltaic array. In the shown embodiment, PV modules A, B, C, D, and E have an equal width, length, and area. Further, each of PV modules A, B, C, D, and E are elevated from the surface of the roof R such that the photovoltaic array formed by PV modules A, B, C, D, and E has a generally uniform and planar profile.

Figure 4:
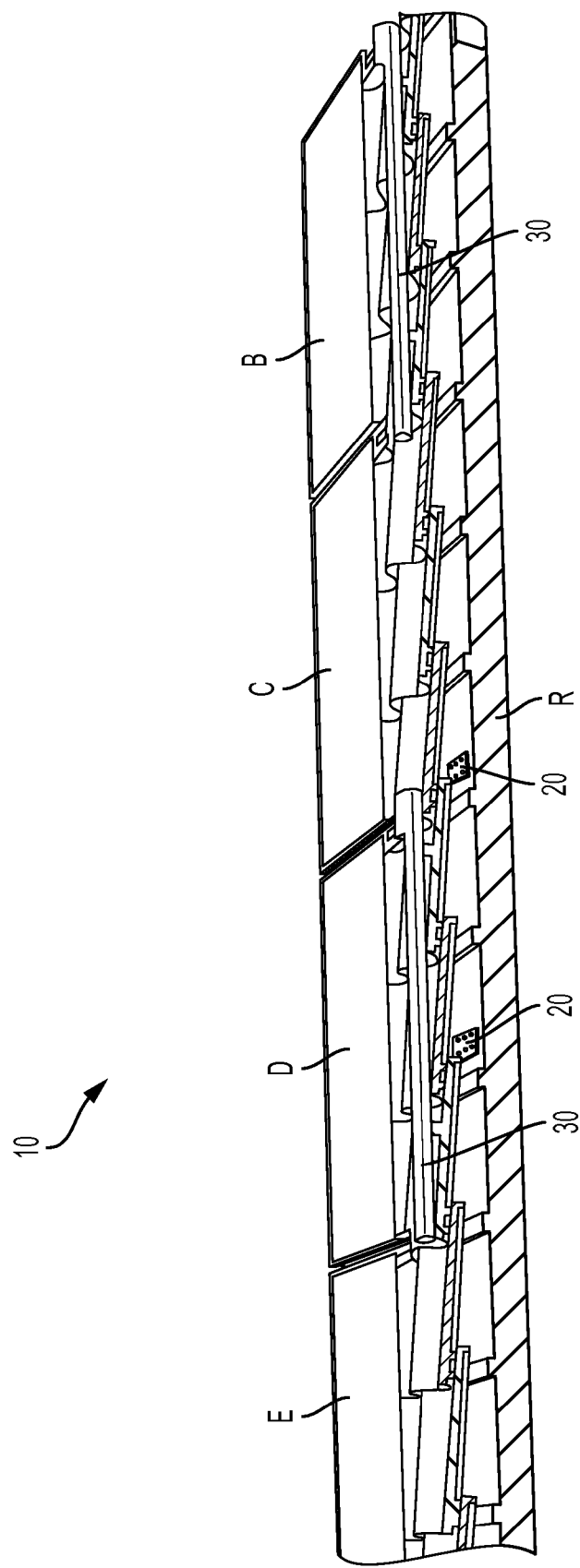
FIG. 4 is a second perspective view of a tile roof with the present system mounted thereon showing the spanner bars omitted under some of the photovoltaic modules, according to aspects of the disclosure.

FIG. 4 is a second perspective view of an exemplary tile roof R with system 10 mounted thereon, showing in part where and how spanner bars 30 are omitted under every second or alternating PV module. In particular, spanner bars 30 are shown beneath both PV module B and PV module D, each spanner bar 30 having a length generally equal to the length of both PV module B and PV module D. In contrast, there are no complete spanner bars 30 directly beneath either PV module C or PV module E. The connector elements extending upward from spanner bars 30 into the gaps between the PV modules couple the PV modules to each other and support the PV modules such that they form a photovoltaic array. In the shown embodiment, PV modules B, C, D, and E have an equal width, length, and area. Alternatively, spanner bar 30 could run all the way from the joint between modules E and D and the joint between modules B and C with separate shorter spanner bars supporting the other sides of modules E and B, thereby preventing the use of spanner bar in the dead space under modules E and B. Further, each of PV modules B, C, D, and E are elevated from the surface of the roof R such that the photovoltaic array formed by PV modules B, C, D, and E has a generally uniform and planar profile.

In some embodiments, a portion of spanner bar 30 can be configured to be directly beneath a given PV module can extend in part underneath an adjacent PV module that is configured to be supported with a spanner bar omitted from underneath that adjacent PV module. In such implementations, however, spanner bar 30 only extends underneath the adjacent PV module to a degree less than a majority of the length of the adjacent PV module. In many implementations, spanner bar 30 only extends underneath the adjacent PV module along the edge or fringe of the adjacent PV module. Conversely, in other implementations, spanner bar 30 can extend a length that is equivalent to two PV modules, three PV modules, four PV modules, or more than four PV modules.

Figure 5:
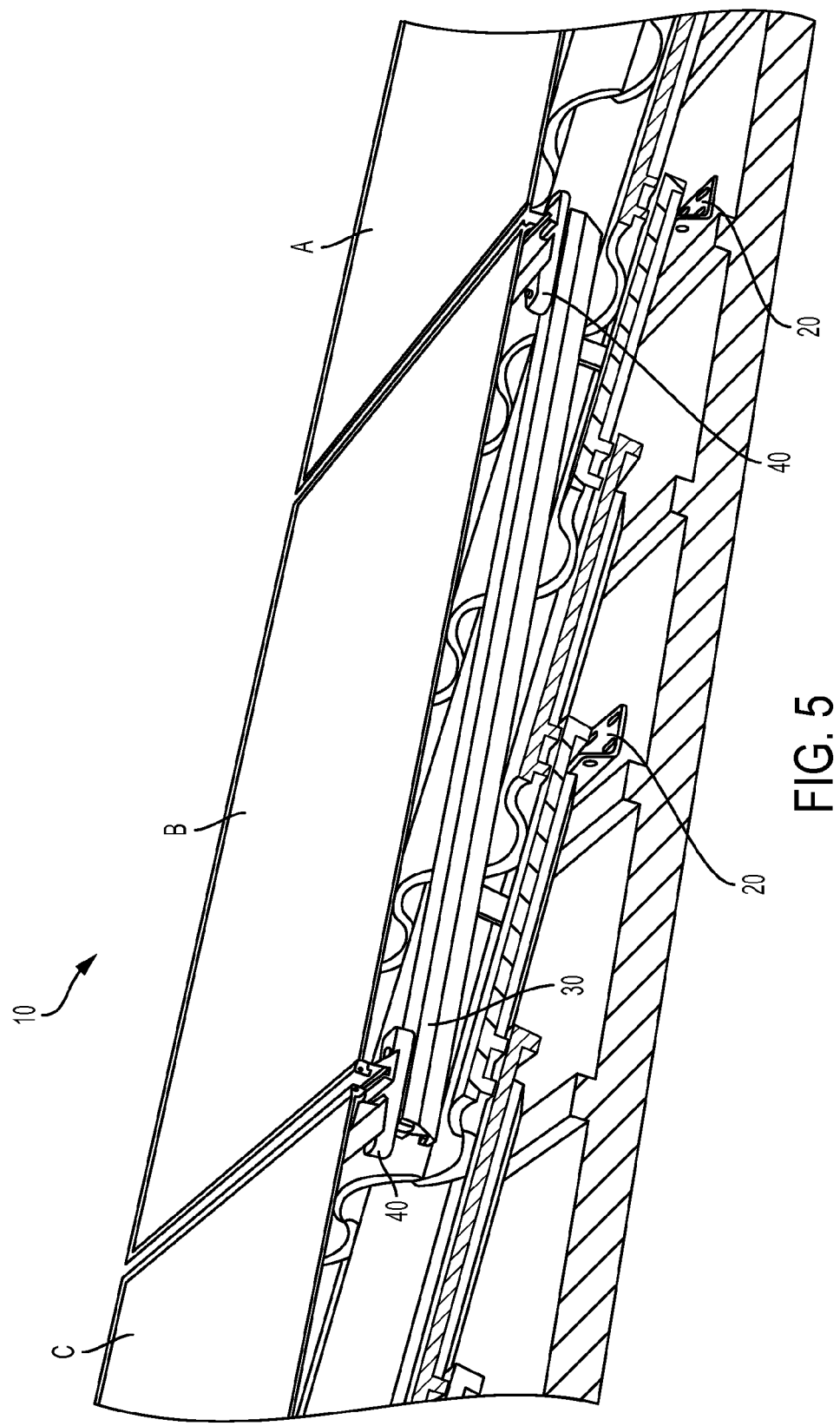
FIG. 5 is a close-up view of one of the spanner bars showing the leveling feet mounted at opposite ends thereof, according to aspects of the disclosure.

FIG. 5 is a close-up view of one of spanner bars 30, showing in further detail leveling feet 40 mounted at opposite ends of spanner bar 30. Spanner bar 30 extends along the length of the roof R beneath PV module B. Spanner bar 30 is generally parallel to the slope of roof R. As shown, spanner bar 30 is also generally parallel to the surface of the photovoltaic array formed by PV modules A, B, and C, but spanner bar 30 is not required to be parallel to the plane formed by the surface of that photovoltaic array. In contrast, spanner bar 30 and the slope of roof R can be different than the surface formed by the photovoltaic array including PV modules A, B, and C as shown. Indeed, the roof R can have an irregular or uneven surface, leading spanner bar 30 to have an orientation or slope different from both the roof R and the surface formed by photovoltaic array including PV modules A, B, and C as shown. Irregularity, unevenness, or difference from a desired orientation in the surface formed by the photovoltaic array can be minimized or eliminated by leveling feet 40 located at the ends of spanner bar 30.

As shown, leveling foot 40 on the left side of spanner bar 30 extends a distance over the left end of spanner bar 30, providing support at the right edge of PV module C and the left edge of PV module B. Conversely, leveling foot 40 on the right side of spanner bar 30 does not extend over the right end of spanner bar 30, providing support at the left edge of PV module A and the right edge of PV module B. The variation in the location of leveling feet 40 along the length of spanner bar 30 reflects the ability of system 10 to adjust where each PV module is supported to ensure that all of PV modules A, B, and C are in alignment with each other for functionality as a photovoltaic array. Both of leveling feet 40 can be adjusted by being moved along the length of spanner bar 30, and both of leveling feet 40 can be rotated about an axis where each leveling foot 40 is secured at a position along the length of spanner bar 30. In the shown embodiment, PV modules A, B, and C have an equal width, length, and area. Further, each of PV modules A, B, and C are elevated from the surface of the roof R such that the photovoltaic array formed by PV modules A, B, and C has a generally uniform and planar profile.

Figure 6:
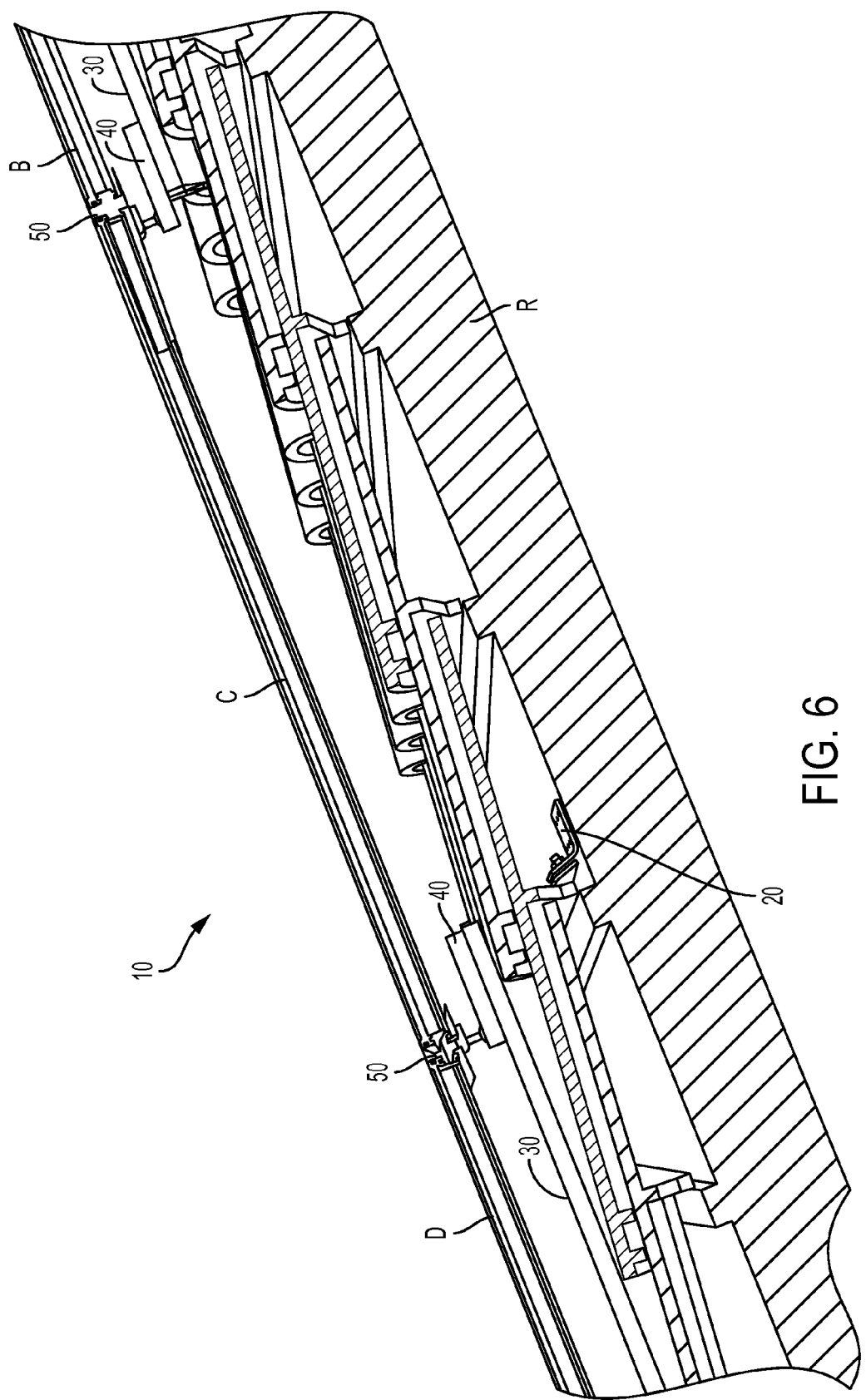
FIG. 6 is another side elevation view of the present system, according to aspects of the disclosure.

FIG. 6 is another side elevation view of system 10. As shown, PV module C is configured to be supported and mounted generally without a spanner bar directly underneath PV module C. As shown, spanner bar 30 primarily underneath PV module D does extend a relatively small amount underneath PV module C, but not to a significant degree. Conversely, spanner bar 30 primarily underneath PV module B does not extend underneath PV module C at all. Both spanner bars 30 have leveling foot 40 that extends to a degree underneath PV module C, though each only to the degree necessary to position module-to-module connector 50 into the gaps between the PV modules. This configuration is considered to be one where a spanner bar is omitted from being underneath PV module C, and spanner bars 30 are present every second module (i.e. underneath PV module B and PV module D).

The variability in the positioning and orientation of leveling feet 40 along the length of spanner bar 30 is further shown in FIG. 6. Spanner bar 30 primarily underneath PV module D has leveling foot 40 secured proximate to the right end of spanner bar 30 with leveling foot 40 rotated to point back along the length of spanner bar 30 toward the left end of spanner bar 30. In this arrangement, module-to-module connector 50 is appropriately positioned, mounted on leveling foot 40, to extend up into the gap between PV module D and PV module C. On the other hand, spanner bar 30 primarily underneath PV module B has leveling foot 40 secured inward from the left end of spanner bar 30 with leveling foot 40 rotated to point out from left end of spanner bar 30. In this arrangement, module-to-module connector 50 is appropriately positioned, mounted on leveling foot 40, to extend up into the gap between PV module B and PV module C. In the shown embodiment, each of PV modules B, C, and D are elevated from the surface of the roof R such that the photovoltaic array formed by PV modules B, C, and D has a generally uniform and planar profile.

Figure 7:
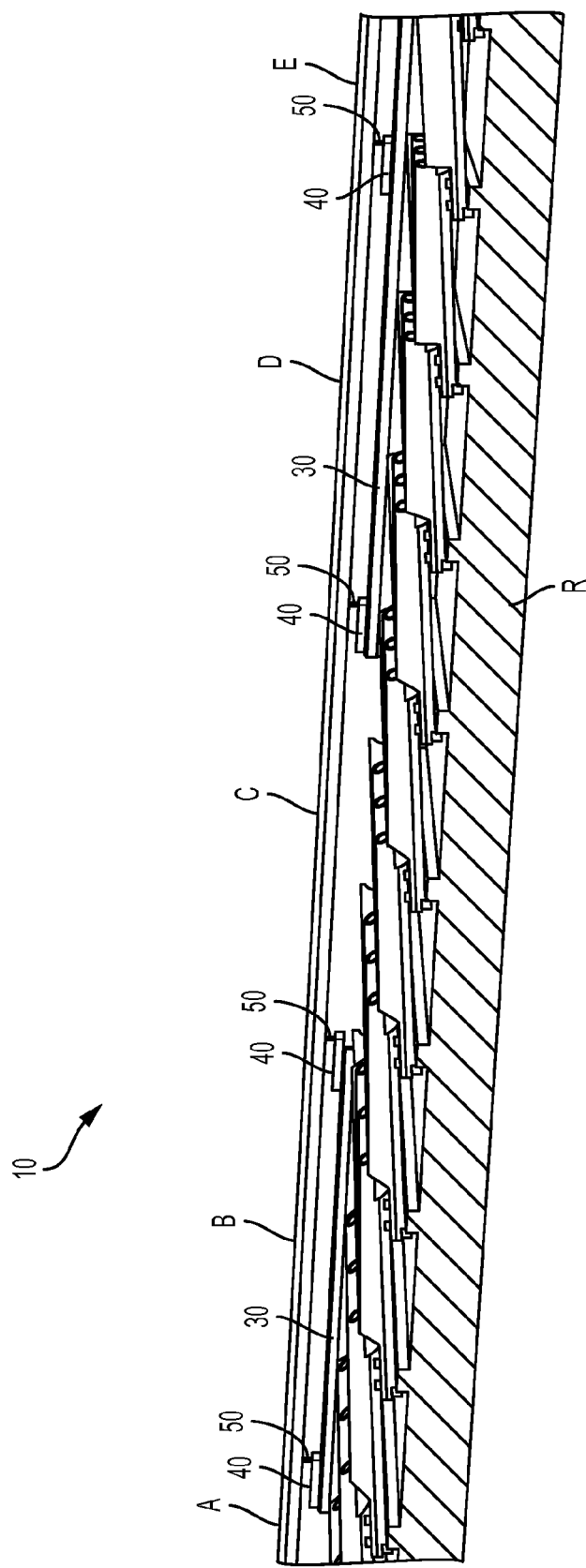
FIG. 7 is another side elevation view of the present system, according to aspects of the disclosure.

FIG. 7 is another side elevation view of system 10. As shown in FIG. 7, PV modules A, B, C, D, and E are supported and aligned by the arrangement of spanner bars 30 primarily beneath PV module B and PV module D, and the corresponding leveling feet 40 and module-to-module connectors 50 at the ends of spanner bars 30. In the shown embodiment, each of PV modules A, B, C, D, and E are elevated from the surface of the roof R such that the photovoltaic array formed by PV modules A, B, C, D, and E has a generally uniform and planar profile.

Figure 8:
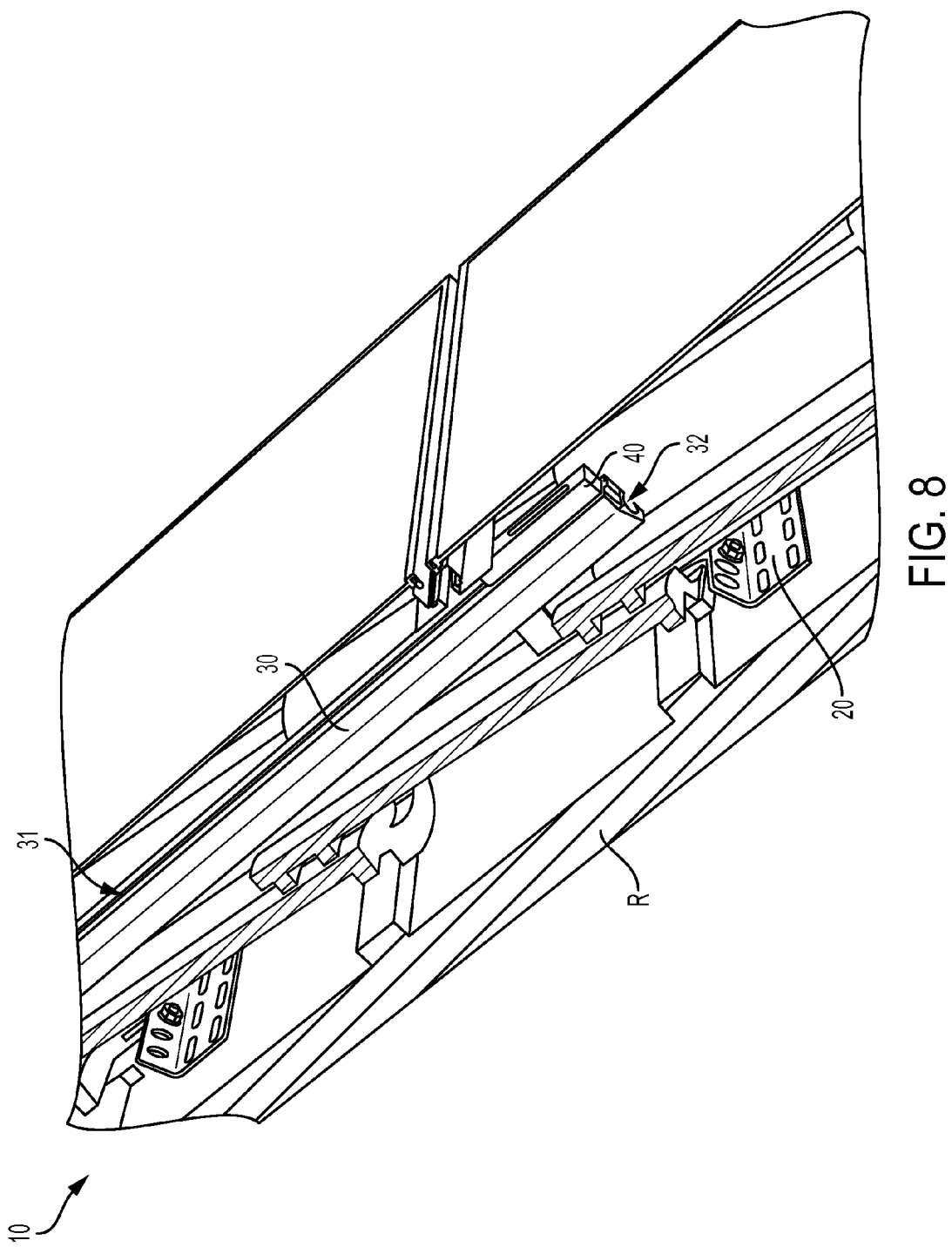
FIG. 8 is a close-up view of one of the ends of the spanner bar showing the leveling foot attached thereto, and a pair of photovoltaic modules mounted thereon, according to aspects of the disclosure.

FIG. 8 is a close-up view of one of the ends of spanner bar 30 showing leveling foot 40 attached thereto, and a pair of photovoltaic modules mounted thereon. In particular, FIG. 8 shows leveling foot 40 secured proximate to the right end of spanner bar 30 (which in this embodiment is a skirt assembly) with leveling foot 40 rotated to point back along the length of spanner bar 30 toward the left end of spanner bar 30. In this arrangement, module-to-module connector 50 is appropriately positioned, mounted on leveling foot 40, to extend up into the gap between the pair of PV modules. Leveling foot 40 is secured to spanner bar 30 via the upper channel 31. Further, side channel 32 is oriented to couple with roof attachment mount 20 on the side of spanner bar 30 facing inward toward the PV modules.

Figure 9A:
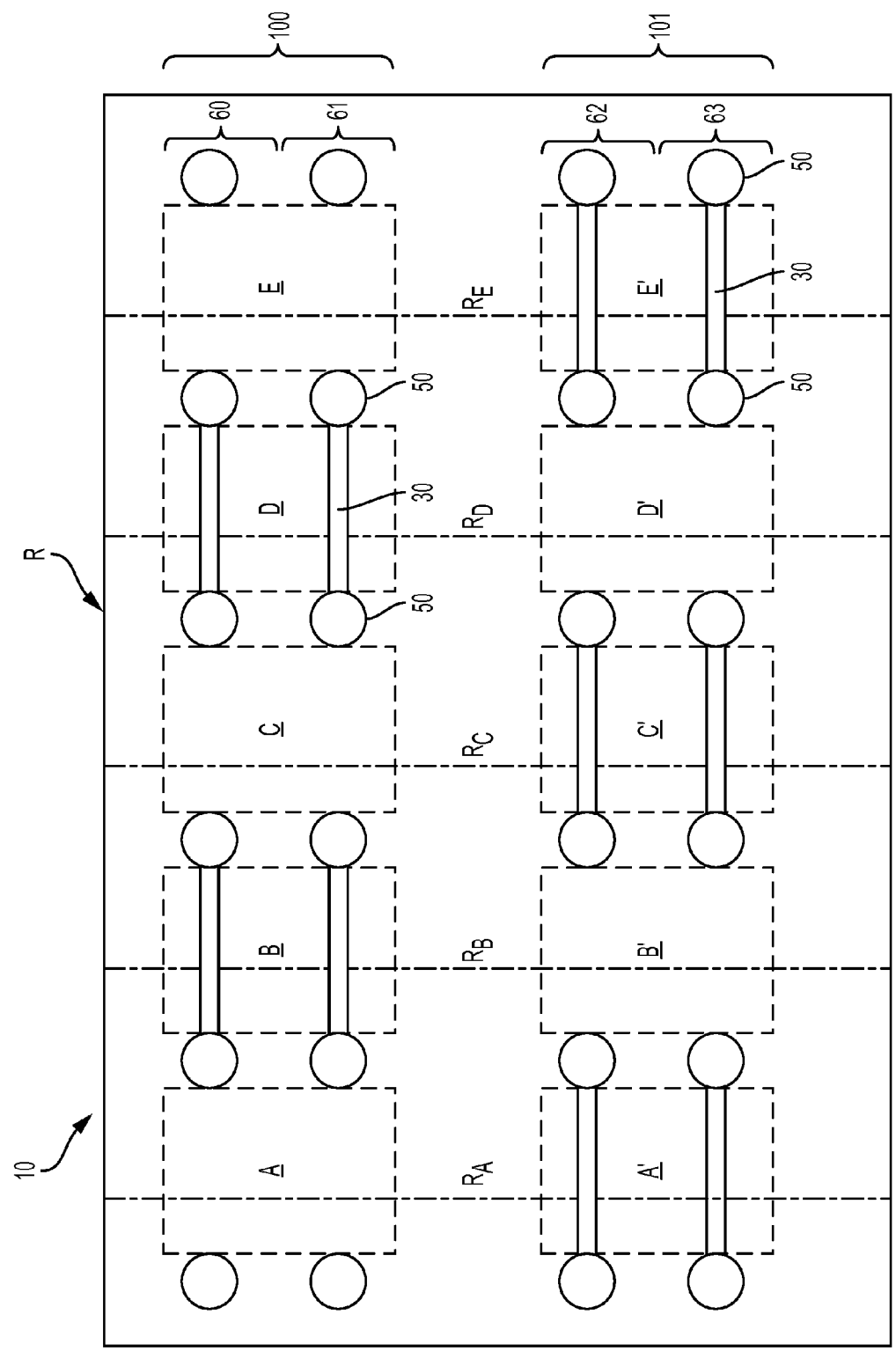
FIG. 9A is a schematic layout of the present system on an exemplary roof, according to aspects of the disclosure.

FIG. 9A is schematic layout of system 10 on an exemplary roof R. First row 100 of the photovoltaic array is configured with spanner bars 30 positioned beneath PV module B and PV module D, with module-to-module connectors 50 located in the gaps between each of the PV modules. First row 100 can include a first set of spanner bars 30 that can define first axis 60 along which a photovoltaic array can be mounted and a second set of spanner bars 30 that can define second axis 61 along which a photovoltaic array can be mounted. Second row 101 of the photovoltaic array is configured with spanner bars 30 positioned beneath PV module A', PV module C', and PV module E', again with module-to-module connectors 50 located in the gaps between each of the PV modules, and further showing module-to-module connectors 50 on the exterior sides of PV module A' and PV module E'. Second row 101 can include a third set of spanner bars 30 that can define third axis 62 along which a photovoltaic array can be mounted and a fourth set of spanner bars 30 that can define fourth axis 63 along which a photovoltaic array can be mounted. Additional module-to-module connectors 50 are located on the exterior sides of PV module A and PV module E, supporting the ends of first row 100, where such module-to-module connectors 50 can be supported by additional mounting structure or on the end of another rail section (not shown). Both sets of spanner bars 30 can be considered to be in a paired arrangement, in that where spanner bars 30 are present underneath a PV module, spanner bars are located on both the upper (north) and lower (south) ends of the PV module. In other words, spanner bars 30 of first axis 60 and second axis 61 are paired and in-line with each other, viewed along the north-south line of the roof R. Similarly, spanner bars 30 of third axis 62 and fourth axis 63 are paired and in-line with each other, viewed along the north-south line of the roof R. Correspondingly, gaps between spanner bars 30 of first axis 60 and second axis 61 are paired and in-line with each other, viewed along the north-south line of the roof R, and gaps between spanner bars 30 of third axis 62 and fourth axis 63 are paired and in-line with each other, viewed along the north-south line of the roof R. The layout of spanner bars 30 in FIG. 9A represents a configuration where the weight or load of first row 100 of the photovoltaic array and the weight or load of second row 101 of the photovoltaic array are distributed across different areas along the length of the roof R.

As shown, one or more rafters in the roof R can run generally beneath PV modules that are relatively in line with each other from one row of the photovoltaic array to the next. For reference, one or more rafters in roof R running generally beneath both of PV module A and PV module A' are represented as $R_A$, one or more rafters in roof R running generally beneath both of PV module B and PV module B' are represented as $R_B$, one or more rafters in roof R running generally beneath both of PV module C and PV module C' are represented as $R_C$, one or more rafters in roof R running generally beneath both of PV module D and PV module D' are represented as $R_D$, and one or more rafters in roof R running generally beneath both of PV module E and PV module E' are represented as $R_E$.

In the embodiment shown in FIG. 9A, rafters $R_A$ directly bear the load from PV module A', through spanner bars 30 (part of third axis 62 and fourth axis 63) located beneath PV module A'. However, the load from PV module A is born by rafters $R_B$, the load being distributed through spanner bars 30 (part of first axis 60 and second axis 61) located beneath PV module B, via the connection of module-to-module connector 50. Similarly, the load from PV module B' is born by both rafters $R_A$ and rafters $R_C$, through spanner bars 30 located beneath PV module A' and PV module C', respectively, via the connection of module-to-module connectors 50. The distributions of load can further follow this pattern. The load from PV module B is directly born by rafters $R_B$, the load being distributed through spanner bars 30 located beneath PV module B. The load from PV module C' is directly born rafters $R_C$, the load being distributed through spanner bars 30 located beneath PV module C'. The load from PV module C is born by both rafters $R_B$ and rafters $R_D$, through spanner bars 30 located beneath PV module B and PV module D, respectively, via the connection of module-to-module connectors 50. The load from PV module D is directly born by rafters $R_D$, the load being distributed through spanner bars 30 located beneath PV module D. The load from PV module D' is born by both rafters $R_C$ and rafters $R_E$, through spanner bars 30 located beneath PV module C' and PV module E', respectively, via the connection of module-to-module connectors 50. The load from PV module E' is directly born rafters $R_E$, the load being distributed through spanner bars 30 located beneath PV module E'. Finally, the load from PV module E is born by rafters $R_D$, through spanner bars 30 located beneath PV module D, via the connection of module-to-module connectors 50. In other words, pairs of spanner bars (or pairs of gaps between spanner bars), from one row of PV modules to the next row of PV modules, can be arranged in an alternating sequence, relative to each other, underneath aligned PV modules. Generally, rafters in roof R located beneath spanner bars 30 can bear the load of PV modules directly above corresponding spanner bars 30, and can also at least partially bear the load of PV modules adjacent to and in contact with module-to-module connectors 50 of corresponding spanner bars 30.

FIG. 9B is an alternative schematic layout of system 10 on an exemplary roof R. As in FIG. 9A, there is first row 100 and second row 101 of a photovoltaic array, each having a set of PV modules. In contrast to the configuration of spanner bars 30 in FIG. 9A (running "east-west" along the length of the roof R), FIG. 9B shows spanner bars 30 in a configuration running "north-south" along the slope of the roof R. Accordingly, spanner bars 30 distribute the load of the photovoltaic array across the rafters of roof R. As shown, spanner bars 30 and module-to-module connectors 50 of first vertical axis 90 and second vertical axis 91 distribute the load of PV module A and PV module A' along either side of rafter $R_A$. Similarly, spanner bars 30 and module-to-module connectors 50 of third vertical axis 92 and fourth vertical axis 93 distribute the load of PV module B and PV module B' along either side of rafter $R_B$. Spanner bars 30 and module-to-module connectors 50 of fifth vertical axis 94 and sixth vertical axis 95 distribute the load of PV module C and PV module C' along either side of rafter $R_C$. Further, spanner bars 30 and module-to-module connectors 50 of seventh vertical axis 96 and eighth vertical axis 97 distribute the load of PV module D and PV module D' along either side of rafter $R_D$. Finally, spanner bars 30 and module-to-module connectors 50 of ninth vertical axis 98 and tenth vertical axis 99 distribute the load of PV module E and PV module E' along either side of rafter $R_E$.

In the embodiment shown in FIG. 9B, spanner bars 30 are positioned in a variety of arrangements for support of the photovoltaic array. Spanner bars 30 along first vertical axis 90 and second vertical axis 91 are paired with each other, but staggered relative to paired spanner bars 30 along third vertical axis 92 and fourth vertical axis 93. Spanner bars 30 beneath PV module C and PV module C' are of different lengths, where spanner bar 30 along fourth vertical axis 94 extends under only PV module C' while spanner bar 30 along fifth vertical axis 95 extends under both PV module C and PV module C'. Conversely, spanner bars 30 beneath PV module E and PV module E' are of equal lengths relative to each other, but spanner bar 30 along ninth vertical axis 98 extends under only PV module E' while spanner bar 30 along tenth vertical axis 99 extends under only PV module E. Finally, spanner bars 30 of both seventh vertical axis 96 and eighth vertical axis 99 extend under both PV module D and PV module D'. As in other embodiments, each PV module is supported by four module-to-module connectors 50 on the sides of each PV module, where module-to-module connectors 50 can be coupled to spanner bars 30 or other mounting structural elements.

Figure 10:
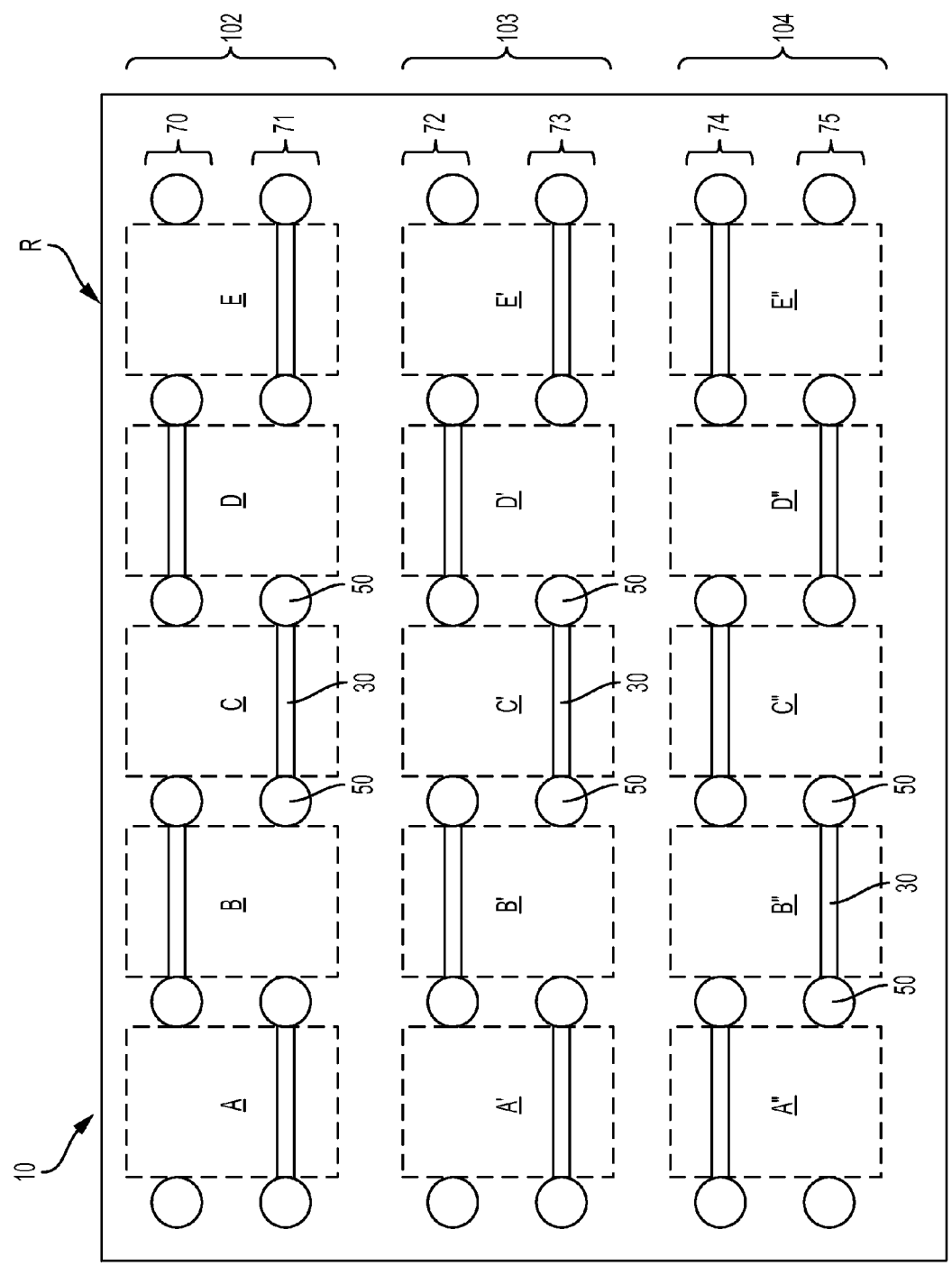
FIG. 10 is an alternative schematic layout of the present system on an exemplary roof, according to aspects of the disclosure.

FIG. 10 is an alternative schematic layout of system 10 on an exemplary roof. It can be understood that rafters in roof R located beneath spanner bars 30 can bear the load of PV modules directly above corresponding spanner bars 30, and can also at least partially bear the load of PV modules adjacent to and in contact with module-to-module connectors 50 of corresponding spanner bars 30. In FIG. 10, upper row 102 of the photovoltaic array is configured such that spanner bars 30 are positioned alternatingly or staggered between PV modules. Specifically, first spanner bar 30 is located beneath a lower (or south) side of PV module A, as part of second axis 71, and second spanner bar 30 is located beneath an upper (or north) side of PV module B, as part of first axis 70. In other words, spanner bars 30 are located alternatingly within an upper position along first axis 70 and a lower position along second axis 71 for upper row 102. Both of first and second spanner bars 30 have module-to-module connectors 50 mounted on the ends of spanner bars 30 (e.g. via leveling feet 40), such that module-to-module connectors 50 extend up into the gap between PV module A and PV module B, coupling, aligning, and structurally supporting the two PV modules. Similarly, third spanner bar 30 is located beneath a lower side of PV module C, fourth spanner bar 30 is located beneath an upper side of PV module D, and fifth spanner bar 30 is located beneath a lower side of PV module E. Each of the spanner bars 30 provide for mounting locations for module-to-module connectors 50 between each of the gaps between PV modules B, C, D, and E, ultimately coupling, aligning, and structurally supporting the all of the PV modules of upper row 102 to form a section of a photovoltaic array. In other words, in a staggered configuration, spanner bars 30 can be positioned opposing ends of adjacent PV modules. This staggered configuration of spanner bars 30 can distribute the load of the PV modules in upper row 102 across the roof R such that no specific rafter or region of the roof R is overly burdened, relative to other sections of the roof R underneath upper row 102.

Middle row 103 of the photovoltaic array is configured similarly to upper row 102, where spanner bars 30 are located alternatingly within an upper position along third axis 72 and a lower position along fourth axis 73 for middle row 103. Specifically, first spanner bar 30 is located beneath a lower side of PV module A', second spanner bar 30 is located beneath an upper side of PV module B', third spanner bar 30 is located beneath a lower side of PV module C', fourth spanner bar 30 is located beneath an upper side of PV module D', and fifth spanner bar 30 is located beneath a lower side of PV module E'. This staggered configuration of spanner bars 30 can distribute the load of the PV modules in middle row 103 across the roof R such that no specific rafter or region of the roof R is overly burdened, relative to other sections of the roof R underneath middle row 103. Moreover, the arrangement of spanner bars 30 in middle row 103 in combination with the arrangement of spanner bars 30 in upper row 102 allow for distribution of the load of both rows of the photovoltaic array across the roof R to further ensure that no specific rafter or region of the roof R is overly burdened, relative to other sections of the roof R underneath middle row 103 and upper row 102. In other words, a first set of the spanner bars 30 located in upper row 102 and a second set of spanner bars located in middle row 103 are arranged in an alternating sequence, relative to each other.

Lower row 104 of the photovoltaic array is configured similarly, but mirrored, relative to upper row 102 and middle row 103, where spanner bars 30 are located alternatingly within an upper position along fifth axis 74 and a lower position along sixth axis 75 for lower row 104. Specifically, in lower row 104, first spanner bar 30 is located beneath an upper side of PV module A", second spanner bar 30 is located beneath a lower side of PV module B", third spanner bar 30 is located beneath an upper side of PV module C", fourth spanner bar 30 is located beneath a lower side of PV module D", and fifth spanner bar 30 is located beneath an upper side of PV module E". This staggered configuration of spanner bars 30 can distribute the load of the PV modules in lower row 104 across the roof R such that no specific rafter or region of the roof R is overly burdened, relative to other sections of the roof R underneath lower row 104. Moreover, the arrangement of spanner bars 30 in lower row 104 in combination with the arrangement of spanner bars 30 in either or both of upper row 102 and middle row 103 allow for distribution of the load of both rows of the photovoltaic array across the roof R to further ensure that no specific rafter or region of the roof R is overly burdened, relative to other sections of the roof R underneath lower row 104, middle row 103, and upper row 102. Further, for each of lower row 104, middle row 103, and upper row 102, the location of spanner bars 30 can be selected to account for the presence or absence of structural support in the frame of roof R. In other words, a first set of the spanner bars 30 located in middle row 103 and a second set of spanner bars located in lower row 104 are arranged in a mirrored alternating sequence, relative to each other.

More generally, from one row of a photovoltaic array to another row of the photovoltaic array, the arrangement of spanner bars 30 (or the gaps between spanner bars 30) along one or more axes in one photovoltaic array row can be staggered relative to the arrangement of spanner bars 30 (or the gaps between spanner bars 30) along one or more axes in another photovoltaic array row. Alternatively, from one row of a photovoltaic array to another row of the photovoltaic array, the arrangement of spanner bars 30 (or the gaps between spanner bars 30) along one or more axes in one photovoltaic array row can be mirrored relative to the arrangement of spanner bars 30 (or the gaps between spanner bars 30) along one or more axes in another photovoltaic array row. Moreover, from one row of a photovoltaic array to another row of the photovoltaic array, the arrangement of spanner bars 30 (or the gaps between spanner bars 30) along one or more axes in one photovoltaic array row can be in-line with the arrangement of spanner bars 30 (or the gaps between spanner bars 30) along one or more axes in another photovoltaic array row, as viewed along the north-south line of a roof. Any given set of photovoltaic array rows can have any combination of these arrangements of spanner bar 30 axes.

Figure 11:
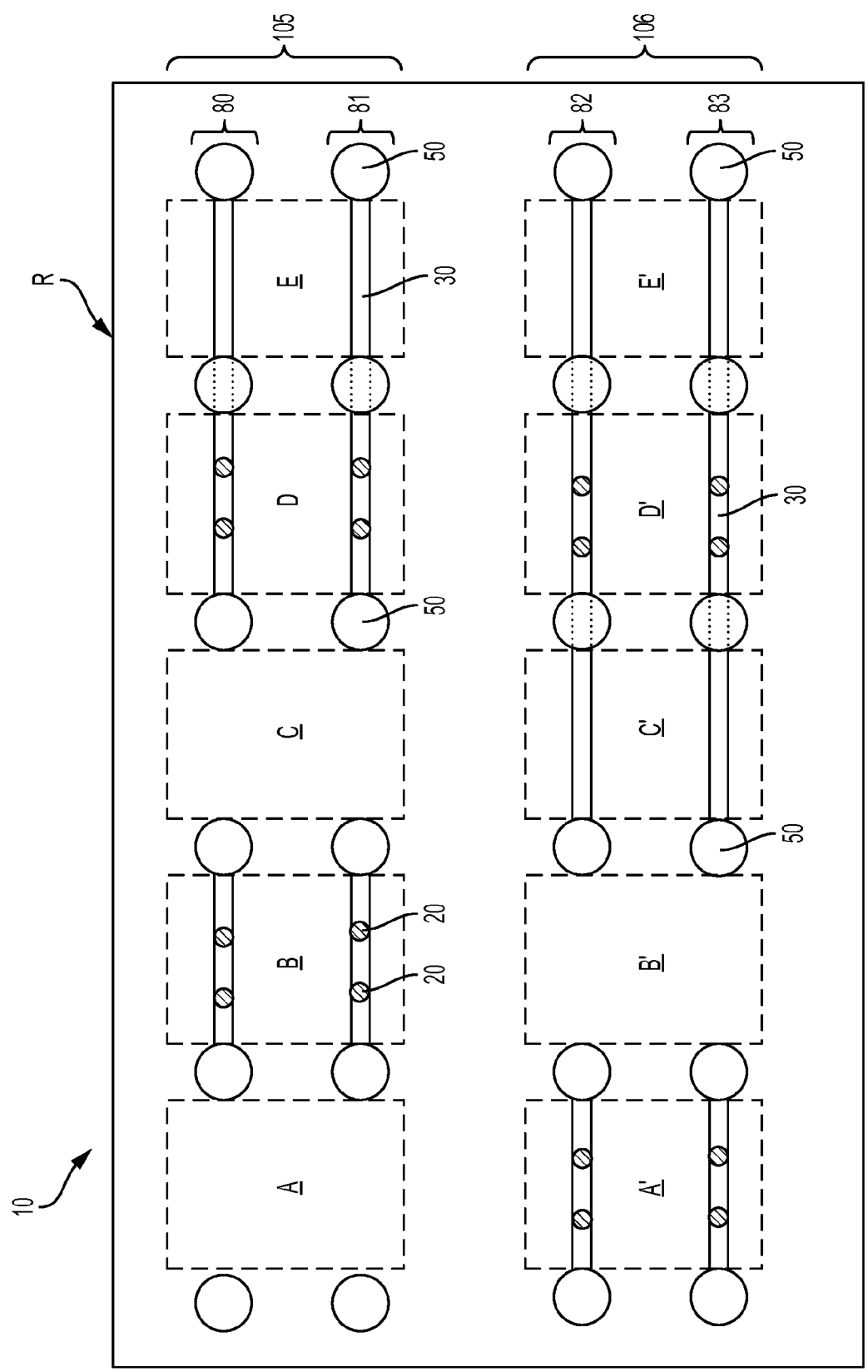
FIG. 11 is a further alternative schematic layout of the present system on an exemplary roof, according to aspects of the disclosure.

FIG. 11 is a further alternative schematic layout of system 10 on an exemplary roof R. It can again be understood that rafters in roof R located beneath spanner bars 30 can bear the load of PV modules directly above corresponding spanner bars 30, and can also at least partially bear the load of PV modules adjacent to and in contact with module-to-module connectors 50 of corresponding spanner bars 30. In FIG. 11, first row 105 of the photovoltaic array is configured with spanner bars 30 positioned beneath PV module B, PV module D, and PV module E along both of first axis 80 and second axis 81, with module-to-module connectors 50 located in the gaps between each of the PV modules. Second row 106 of the photovoltaic array is configured with spanner bars 30 positioned beneath PV module A', PV module C', PV module D', and PV module E' along both of third axis 82 and fourth axis 83, again with module-to-module connectors 50 located in the gaps between each of the PV modules, and further showing module-to-module connectors 50 on the exterior sides of PV module A' and PV module E'. The layout of spanner bars 30 in FIG. 11 represents a configuration where the weight or load of first row 105 of the photovoltaic array and the weight or load of second row 106 of the photovoltaic array are distributed across different areas along the length of the roof R.

Further shown are the locations of roof attachment mounts 20 supporting each of spanner bars 30 for both of first row 105 of the photovoltaic array and second row 106 of the photovoltaic array. As shown, roof attachment mounts 20 can be located underneath spanner bars 30 that are primarily underneath a single PV module, such as PV module B of first row 105 or PV module A' of second row 106 (or as in the PV modules shown in FIG. 9A, FIG. 9B, and FIG. 10). Roof attachment mounts 20 connect spanner bars 30 to the roof R, and can further connect to structural aspects of the roof R frame (such as rafters) to secure system 10. In other aspects of system 10, roof attachment mounts 20 are located beneath spanner bars 30 that extend underneath more than one PV module. In first row 105, spanner bars 30 extend underneath PV module D and PV module E, with roof attachment mounts 20 beneath spanner bars 30 below PV module D. In this aspect, spanner bar 30 extends underneath and supports PV module E in cantilever. Similarly, in second row 106, spanner bars 30 extend underneath PV module C, PV module D, and PV module E, with roof attachment mounts 20 beneath spanner bars 30 below PV module D. In this aspect, spanner bar 30 extends underneath and supports both PV module C and PV module E in cantilever.

As seen in FIGS. 9A, 9B, 10, and 11, the load on individual rafters or sets of rafters in a roof R can be distributed and reduce strain on any given set of rafters. Moreover, the flexibility of the present system allows for positioning of spanner bars 30 where rafters or other structural support elements are actually located in a roof R, as any given roof R may have a unique or irregular framing structure, such that PV modules mounted onto spanner bars 30 are fully supported and the load of the photovoltaic array is safely born by the roof R. It can be further understood that arrangements of spanner bars 30 as shown in FIG. 10 and FIG. 11 can run north-south along a roof R (i.e. in an orientation as in FIG. 9B), as needed and appropriate for a given photovoltaic array installation.

Figure 12:
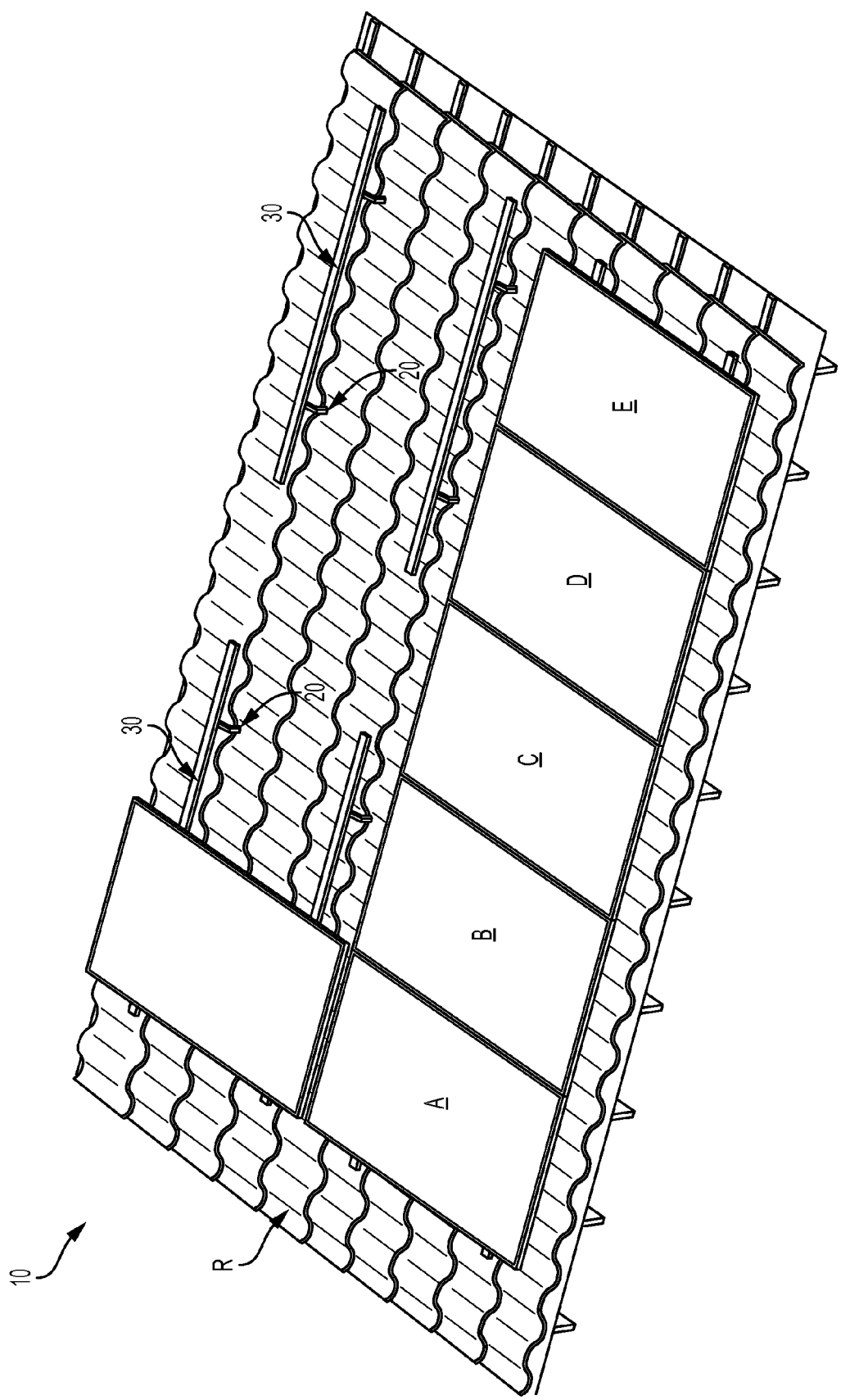
FIG. 12 is a perspective view of an partial layout of the present system on an exemplary roof, according to aspects of the disclosure.

FIG. 12 is a perspective view of an partial layout of system 10 on an exemplary roof R, showing a partial installation of a photovoltaic array. PV modules A, B, C, D, and E are shown as a fully installed lower row of the photovoltaic array. An upper row of the photovoltaic array on the north edge of the roof R is shown as partially installed, and shows two pairs of spanner bars 30, attached to the roof R via roof attachment mounts 20, with a gap between the two pairs of spanner bars 30. In a completed installation of the upper row, no spanners bars are designed to be primarily underneath a PV module located over the gap between the two pairs of spanner bars 30. Further, as shown, roof attachment mounts 20 of spanner bars 30 in the upper row are configured to support two PV modules on each paring of spanner bars 30, with a pair of roof attachment mounts 20 arranged to be located beneath both of the two PV modules. In alternative implementations, roof attachment mounts 20 can be arranged to be located underneath only one of the two PV modules, thereby holding the spanner bars 30 and the other PV module in cantilever.

Figure 13:
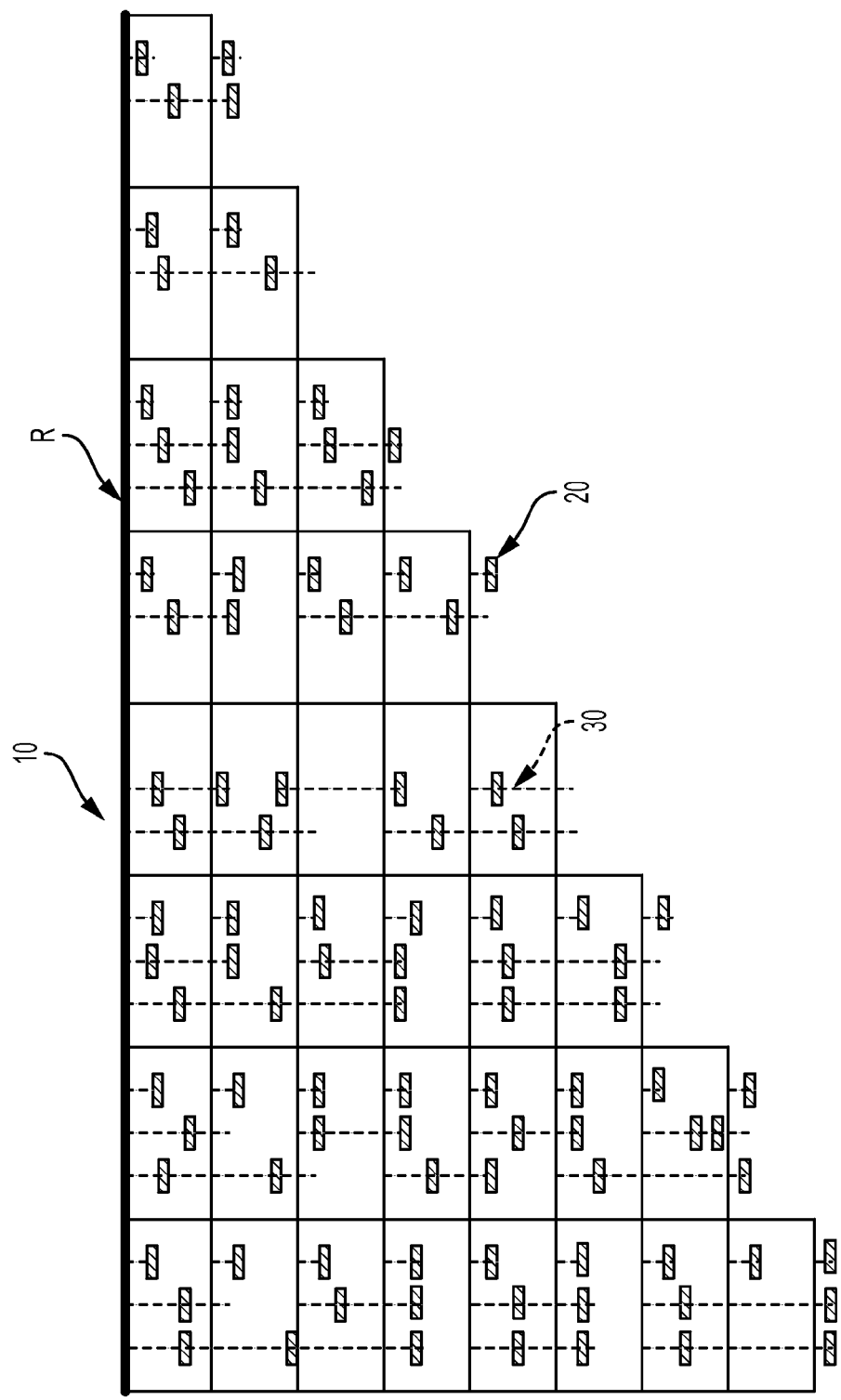
FIG. 13 is a schematic plan view of an roof having an embodiment of the present system, according to aspects of the disclosure.

FIG. 13 is a schematic plan view of an roof having an embodiment of system 10. As shown, FIG. 13 provides a number of example of how spanner bars 30 and roof attachment mounts 20 can be distributed and arranged along a roof R, specifically in a north-south orientation along the slope of the roof R. In various aspects, spanner bars 30 extend under one, two, three, or four PV modules, with one or more roof attachment mounts anchoring spanner bars 30 to the roof R at various points along spanner bars. In further exemplary aspects, either two or three axes of spanner bars 30 can be located underneath a given column of PV modules. Generally, FIG. 13 shows the wide variety of locations, arrangements, and implementations of support spanner bars 30 and roof attachment mounts 20 can provide for system 10.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting system for a photovoltaic array, comprising:
   a first plurality of spanner bars arranged along a first axis and configured to mount a structure along the first axis;
   a first plurality of leveling feet, wherein each spanner bar of the first plurality of spanner bars comprises first and second longitudinal ends each configured to support one of the first plurality of leveling feet; and
   a first plurality of module-to-module connectors, wherein each leveling foot of the first plurality of leveling feet is configured to support one of the connectors of the first plurality of module-to-module connectors,
   wherein each module-to-module connector of the first plurality of module-to-module connectors is configured to support at least two photovoltaic modules along the first axis, such that at least one photovoltaic module spans a longitudinal gap, wherein the longitudinal gap comprises a space along the first axis between the first end of a spanner bar of the first plurality of spanner bars and the second end of an adjacent spanner bar of the first plurality of spanner bars, and wherein the at least one photovoltaic module is supported only by module-to-module connectors along the first axis, wherein the first axis runs underneath the at least two photovoltaic modules.

2. The mounting system of claim 1, wherein a position of the first plurality of leveling feet is adjustable for alignment of the photovoltaic modules along the first axis.

3. The mounting system of claim 1, further comprising:
   a second plurality of spanner bars arranged along a second axis and configured to mount a structure along the second axis;
   a second plurality of leveling feet, wherein each spanner bar of the second plurality of spanner bars comprises two longitudinal ends each configured to support one of the second plurality of leveling feet; and
   a second plurality of module-to-module connectors, wherein each leveling foot of the second plurality of leveling feet is configured to support one of the second plurality of module-to-module connectors,
   wherein each module-to-module connector of the second plurality of module-to-module connectors is configured to support at least two photovoltaic modules along the second axis, such that at least one photovoltaic module can span a longitudinal gap, wherein one or more longitudinal gaps are present along the second axis between longitudinal ends of the second plurality of spanner bars, and be supported only by module-to-module connectors of the second plurality of module-to-module connectors along the second axis, wherein the second axis runs underneath the at least two photovoltaic modules.

4. The mounting system of claim 3, wherein a position of the second plurality of leveling feet are adjustable for alignment of the photovoltaic modules along the second axis.

5. The mounting system of claim 3, wherein one or more longitudinal gaps along the first axis within the first plurality of spanner bars are paired relative to one or more longitudinal gaps along the second axis within the second plurality of spanner bars.

6. The mounting system of claim 3, wherein one or more longitudinal gaps along the first axis within the first plurality of spanner bars is staggered relative to one or more longitudinal gaps along the second axis within the second plurality of spanner bars.

7. The mounting system of claim 3, further comprising a second plurality of spaced-apart roof attachment mounts upon which the second plurality of spanner bars are mounted to form the second axis, wherein one or more of the second plurality of spanner bars are mounted onto the second plurality of roof attachment mounts in cantilever.

8. The mounting system of claim 1, further comprising a first plurality of spaced-apart roof attachment mounts upon which the first plurality of spanner bars are mounted to form the first axis, wherein one or more of the first plurality of spanner bars are mounted onto the first plurality of roof attachment mounts in cantilever.

9. The mounting system of claim 8, wherein the roof attachment mounts comprise a tile hook and a flashing.

10. The mounting system of claim 8, wherein the ends of the spanner bars are connected to the roof attachment mounts.

11. The mounting system of claim 1, wherein the leveling feet are connected into an upper channel in the spanner bars.

12. The mounting system of claim 1, wherein the leveling feet each rotate around a base portion mounted onto the spanner bar.

13. The mounting system of claim 1, wherein the module-to-module connectors are rock-it connectors.

14. A mounting system for a photovoltaic array, comprising:
    a first plurality of spanner bars configured to mount a structure along a first axis, having one or more spanner bar gaps along the first axis between adjacent members of the first plurality of spanner bars;
    a second plurality of spanner bars configured to mount a structure along a second axis, having one or more spanner bar gaps along the second axis between adjacent members of the second plurality of spanner bars, the second axis being parallel to the first axis;
    a plurality of leveling feet, wherein each spanner bar of the first plurality of spanner bars and the second plurality of spanner bars comprises ends configured to support one of the plurality of leveling feet; and
    a plurality of module-to-module connectors, wherein each leveling foot of the plurality of leveling feet is configured to support at least one of the plurality of module-to-module connectors, wherein each module-to-module connector of the plurality of module-to-module connectors is configured to support at least two photovoltaic modules, further wherein a first subset of the plurality of the module-to-module connectors support photovoltaic modules along the first axis and wherein a second subset of the plurality of the module-to-module connectors support photovoltaic modules along the second axis, such that at least one photovoltaic module spans one or more spanner bar gaps along either or both of the first axis or the second axis.

15. The mounting system of claim 14, wherein a position of each of the plurality of leveling feet is adjustable for alignment of the photovoltaic modules along either the first axis or the second axis.

16. The mounting system of claim 14, wherein one or more of the spanner bar gaps along the first axis within the first plurality of spanner bars are paired relative to one or more of the spanner bar gaps along the second axis within the second plurality of spanner bars.

17. The mounting system of claim 14, wherein one or more of the spanner bar gaps along the first axis within the first plurality of spanner bars is staggered relative to one or more of the spanner bar gaps along the second axis within the second plurality of spanner bars.

18. The mounting system of claim 14, further comprising:
a third plurality of spanner bars configured to mount a structure along a third axis, having one or more spanner bar gaps between individual members of the third plurality of spanner bars; and
a fourth plurality of spanner bars configured to mount a structure along a fourth axis, having one or more spanner bar gaps between individual members of the fourth plurality of spanner bars,
wherein each spanner bar of the third plurality of spanner bars and the fourth plurality of spanner bars comprises ends configured to support one of the plurality of leveling feet, and wherein a third subset of the plurality of the module-to-module connectors support photovoltaic modules along the third axis and wherein a fourth subset of the plurality of the module-to-module connectors support photovoltaic modules along the fourth axis, such that at least one photovoltaic module can span one or more spanner bar gaps along either or both of the third axis or the fourth axis and be supported by module-to-module connectors along the third axis and fourth axis,
further wherein the arrangement of the first plurality of spanner bars and the second plurality of spanner bars are staggered relative to the arrangement of the third plurality of spanner bars and the fourth plurality of spanner bars.

19. The mounting system of claim 14, further comprising:
a third plurality of spanner bars configured to mount a structure along a third axis, having one or more spanner bar gaps between individual members of the third plurality of spanner bars; and
a fourth plurality of spanner bars configured to mount a structure along a fourth axis, having one or more spanner bar gaps between individual members of the fourth plurality of spanner bars,
wherein each spanner bar of the third plurality of spanner bars and the fourth plurality of spanner bars comprises ends configured to support at least one of the plurality of leveling feet and a third subset of the plurality of the module-to-module connectors support photovoltaic modules along the third axis and wherein a fourth subset of the plurality of the module-to-module connectors support photovoltaic modules along the fourth axis, such that at least one photovoltaic module can span one or more spanner bar gaps along either or both of the third axis or the fourth axis and be supported by module-to-module connectors along the third axis and fourth axis,
further wherein the arrangement of the first plurality of spanner bars and the second plurality of spanner bars are mirrored relative to the arrangement of the third plurality of spanner bars and the fourth plurality of spanner bars.

* * * * *